United States Patent
Asukai

(10) Patent No.: US 11,138,282 B2
(45) Date of Patent: Oct. 5, 2021

(54) INFORMATION PROCESSING SYSTEM, INFORMATION PROCESSING DEVICE, INFORMATION PROCESSING METHOD, AND STORAGE MEDIUM FOR CALCULATING DEGREE OF HAPPINESS IN AN AREA

(71) Applicant: SONY CORPORATION, Tokyo (JP)

(72) Inventor: Masamichi Asukai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 321 days.

(21) Appl. No.: 15/578,072

(22) PCT Filed: Mar. 1, 2016

(86) PCT No.: PCT/JP2016/056243
§ 371 (c)(1),
(2) Date: Nov. 29, 2017

(87) PCT Pub. No.: WO2016/199458
PCT Pub. Date: Dec. 15, 2016

(65) Prior Publication Data
US 2018/0150470 A1    May 31, 2018

(30) Foreign Application Priority Data

Jun. 9, 2015 (JP) .............................. JP2015-116953

(51) Int. Cl.
*G06F 16/9537*    (2019.01)
(52) U.S. Cl.
CPC ................................ *G06F 16/9537* (2019.01)
(58) Field of Classification Search
None
See application file for complete search history.

(56) References Cited

U.S. PATENT DOCUMENTS

| 8,510,295 B1 * | 8/2013 | Dayan | G06F 16/50 |
| | | | 707/723 |
| 8,915,215 B1 * | 12/2014 | Helgeson | G16H 40/67 |
| | | | 119/421 |

(Continued)

FOREIGN PATENT DOCUMENTS

| JP | 2004-320217 A | 11/2004 |
| JP | 2010-211547 A | 9/2010 |

OTHER PUBLICATIONS

Couples are happier, captured on Dec. 20, 2019, Google.com, https://scholar.google.com/scholar?hl=en&as_sdt=0%2C47&q=couples+are+happier&btnG=.*

(Continued)

*Primary Examiner* — Jason G Liao
(74) *Attorney, Agent, or Firm* — Chip Law Group

(57) ABSTRACT

An information processing system, an information processing device, an information processing method, and a storage medium are provided that can extract group terminals from among a plurality of surrounding information processing terminals that have been detected, and calculate a degree of happiness in a surrounding area. The information processing system includes a communication unit configured to receive identification information from a detection device that detects the identification information of a surrounding terminal device, and a control unit configured to extract, as group terminal devices, a plurality of pieces of identification information that are received by the communication unit and indicate a plurality of terminal devices detected by the detection device within a predetermined time, and to calculate a degree of happiness around the detection device in accordance with an extraction result.

18 Claims, 35 Drawing Sheets

(56) References Cited

U.S. PATENT DOCUMENTS

2012/0296855 A1* 11/2012 Matzner ................ A61B 5/165
706/11
2015/0049953 A1* 2/2015 Movellan ........... G06K 9/00302
382/197
2018/0349818 A1* 12/2018 Chan .................. G06Q 10/0639

OTHER PUBLICATIONS

Groups are happier, captured on Dec. 20, 2019, Google.com, https://scholar.google.com/scholar?hl=en&as_sdt=0%2C47&q=couples+are+happier&btnG=.*

IMapBuilder, Visualize Region Data by Overlying Bubble Chart on the Map Nov. 25, 2013, youtube, https://www.youtube.com/watch?v=HqwXROietRg.*

Canetti, Crowds and Power 1960, Noonday Press, pp. 48-63.*

Crowd Size Happiness Jun. 1, 2021, Google, https://scholar.google.com/scholar?hl=en&as_sdt=0%2C47&q=crowd+size+happiness&btnG=.*

International Search Report and Written Opinion of PCT Application No. PCT/JP2016/056243, dated May 24, 2016, 5 pages of English Translation and 5 pages of ISRWO.

"Development of a New Wearable Sensor That Can Measure "Organization Activity Level" Correlating with the Happiness of the Group", Hitachi High-Technologies Corporation Hitachi, Ltd., Feb. 9, 2015, 3 pages.

International Preliminary Report on Patentability of PCT Application No. PCT/JP2016/056243, dated Dec. 21 2017, 6 pages of English Translation and 4 pages of IPRP.

"Development Of A New Wearable Sensor That Can Measure "Organization Activity Level" Correlating With The Happiness Of The Group", Hitachi High-Technologies Corporation Hitachi, Ltd., Feb. 9, 2015, 7 pages.

* cited by examiner

FIG.11

| TIME STAMP | DETECTION DEVICE ID | TERMINAL ID LIST |
|---|---|---|
| 1421821080 | MN0F876E6D | 4E14D94C, E26DBA29, 42CC63CE |
| 1421821110 | MN0F876E6D | 4E14D94C, 42CC63CE |
| 1421821140 | MN0F876E6D | 2B62F1DF, E99B7FAD, 1351A070, 8686BC58, 01EED953 |
| 1421821170 | MN0F876E6D | BD0EB80F, 0061B484 |

FIG.12

|     | $p_1$    | $p_2$    | $p_3$    | ... | $p_N$ |
|-----|----------|----------|----------|-----|-------|
| $p_1$ | $n_{11}$ | $n_{12}$ | $n_{13}$ | ... |       |
| $p_2$ | $n_{21}$ | $n_{22}$ | $n_{23}$ | ... |       |
| $p_3$ | $n_{31}$ | $n_{32}$ | $n_{33}$ | ... |       |
| ... | ...      | ...      | ...      | ... |       |
| $p_N$ |          |          |          |     |       |

FIG.13

|     | $p_1$    | $p_2$    | $p_3$    | ... | $p_N$ |
|-----|----------|----------|----------|-----|-------|
| $p_1$ | 1        | $c_{12}$ | $c_{13}$ | ... |       |
| $p_2$ | $c_{21}$ | 1        | $c_{23}$ | ... |       |
| $p_3$ | $c_{31}$ | $c_{32}$ | 1        | ... |       |
| ... | ...      |          |          |     |       |
| $p_N$ |          |          |          |     |       |

| COUPLE TERMINAL CANDIDATES | |
|---|---|
| 01D294B4 | 8F924ED2 |
| 01D294B4 | F70BC192 |
| 03E3FE7B | A1C233B8 |
| 03E3FE7B | AA5666A8 |
| 03E3FE7B | C1667DC9 |
| 03E3FE7B | E08C7B31 |
| 09DF5A1F | 9ADB2EC4 |
| ... | ... |

SEPARATION

| GROUP TERMINAL CANDIDATES | | | | | | | | |
|---|---|---|---|---|---|---|---|---|
| 09DF5A1F | 9ADB2EC4 | | | | | | | |
| 0FA3D4C1 | 589EB2FE | | | | | | | |
| 239780D1 | B8315059 | | | | | | | |
| 4C6A54B3 | F73217C0 | | | | | | | |
| A82F4050 | C6153E38 | | | | | | | |
| 01D294B4 | 8F924ED2 | F70BC192 | | | | | | |
| 57DEDC81 | D1E375B1 | E2B66372 | | | | | | |
| 68053CDD | D56C891D | EA613828 | | | | | | |
| 03E3FE7B | A1C233B8 | AA5666A8 | C1667DC9 | D2331000 | E08C7B31 | | | |
| ... | ... | ... | ... | ... | ... | | | |

FIG.16

| DETECTION DEVICE ID | $t_1$ | $t_2$ | $N_2$ | $N_3$ | $N_4$ |
|---|---|---|---|---|---|
| MN0F876E6D | 1421821080 | 1434761270 | 5 | 3 | 1 |
| MN2F5FE174 | 1421821110 | 1427462220 | 2 | 1 | 5 |
| MN521F4CFC | 1421821110 | 1445223510 | 3 | 2 | 1 |
| MN5AE9D840 | 1421821210 | 1426731350 | 7 | 1 | 0 |
| ... | ... | | | | |

FIG.17

| NUMBER OF TERMINALS | HAPPINESS COEFFICIENT |
|---|---|
| 2 | 2.0 |
| 3 | 1.0 |
| 4 OR MORE | 0.5 |

FIG.31

| DETECTION DEVICE ID | LATITUDE | LONGITUDE | PLACE INFORMATION |
|---|---|---|---|
| MN0F876E6D | 35.64966 | 139.75208 | OFFICE AREA |
| MN2F5FE174 | 35.59689 | 139.66732 | RESIDENTIAL AREA |
| MN521F4CFC | 35.71528 | 139.79454 | AMUSEMENT PARK |

FIG.32

| NUMBER OF TERMINALS | AMUSEMENT PARK | | OFFICE AREA | | |
|---|---|---|---|---|---|
| | 06:00 TO 18:00 | 18:00 TO 06:00 | 06:00 TO 18:00 ON WEEKDAY | OTHER THAN LEFT | ... |
| 2 | 2.0 | 3.0 | 0.1 | 2.0 | ... |
| 3 | 1.0 | 1.5 | 0.1 | 1.0 | ... |
| 4~ | 0.5 | 1.0 | 0.1 | 0.5 | ... |

|  | $p_1$ | $p_2$ | ... | $p_b$ | ... | $p_N$ |
|---|---|---|---|---|---|---|
| $p_1$ | 1 | $c_{12}$ | ... | 0.08 | ... |  |
| $p_2$ | $c_{21}$ | 1 | ... | 0.01 | ... |  |
| ... | ... | ... | ... | ... | ... |  |
| $p_b$ | 0.08 | 0.01 | ... | 1 | ... |  |
| ... | ... | ... | ... | ... | ... |  |
| $p_N$ |  |  |  |  |  |  |

FIG.36

| NUMBER OF TERMINALS | HAPPINESS COEFFICIENT |
|---|---|
| 2 | 2.0 |
| 3 | 1.0 |
| 4 OR MORE | 0.5 |
| SINGLE-PERSON TERMINAL | -0.1 |

# INFORMATION PROCESSING SYSTEM, INFORMATION PROCESSING DEVICE, INFORMATION PROCESSING METHOD, AND STORAGE MEDIUM FOR CALCULATING DEGREE OF HAPPINESS IN AN AREA

CROSS REFERENCE TO RELATED APPLICATIONS

This application is a U.S. National Phase of International Patent Application No. PCT/JP2016/056243 filed on Mar. 1, 2016, which claims priority benefit of Japanese Patent Application No. JP 2015-116953 filed in the Japan Patent Office on Jun. 9, 2015. Each of the above-referenced applications is hereby incorporated herein by reference in its entirety.

TECHNICAL FIELD

The present disclosure relates to an information processing system, an information processing device, an information processing method, and a storage medium.

BACKGROUND ART

Technologies for estimating human emotions using biometric data such as an electroencephalogram, a pulse, and a sweat rate have recently been proposed. Thereby, for example, it is possible to measure whether or not a person is happy.

CITATION LIST

Patent Literature

Patent Literature 1: JP 2004-320217A

DISCLOSURE OF INVENTION

Technical Problem

However, the happiness of individuals is only measured in the above-described conventional technology and no technology for measuring the happiness of people linked with a place has been proposed. For example, in a case where quantified happiness is defined as a "degree of happiness" under the assumption that it is fun for two persons rather than a single person to spend time, a place where many groups of multiple people gather or a place where couples are located is said to be a place where the degree of happiness is high.

Here, in Patent Literature 1, technology for acquiring group information by grouping portable terminal devices having position information which is common throughout a predetermined time interval has been proposed. However, the group information is used when optimum information is provided to a group and a method of easily measuring a degree of happiness in a place thereof is never taken into account.

Therefore, the present disclosure provides an information processing system, an information processing device, an information processing method, and a storage medium that can extract group terminals from among a plurality of surrounding information processing terminals that have been detected, and calculate a degree of happiness in a surrounding area.

Solution to Problem

According to the present disclosure, there is provided an information processing system including: a communication unit configured to receive identification information from a detection device that detects the identification information of a surrounding terminal device; and a control unit configured to extract, as group terminal devices, a plurality of pieces of identification information that are received by the communication unit and indicate a plurality of terminal devices detected by the detection device within a predetermined time, and to calculate a degree of happiness around the detection device in accordance with an extraction result.

According to the present disclosure, there is provided an information processing device including: a detection unit configured to detect identification information of a surrounding terminal device; and a control unit configured to extract, as group terminal devices, a plurality of pieces of identification information indicating a plurality of terminal devices detected by the detection unit within a predetermined time and to calculate a degree of happiness around the detection unit on the basis of an extraction result.

According to the present disclosure, there is provided an information processing method including: receiving, by a communication unit, identification information from a detection device that detects the identification information of a surrounding terminal device; and extracting, by a control unit, as group terminal devices, a plurality of pieces of identification information that are received by the communication unit and indicate a plurality of terminal devices detected by the detection device within a predetermined time, and calculating a degree of happiness around the detection device in accordance with an extraction result.

According to the present disclosure, there is provided a computer-readable storage medium having a program stored therein, the program causing a computer to function as: a detection unit configured to detect identification information of a surrounding terminal device; and a control unit configured to extract, as group terminal devices, a plurality of pieces of identification information indicating a plurality of terminal devices detected by the detection unit within a predetermined time and to calculate a degree of happiness around the detection unit on the basis of an extraction result.

Advantageous Effects of Invention

According to the present disclosure as described above, it is possible to extract group terminals from among a plurality of surrounding information processing terminals that have been detected and calculate a degree of happiness in a surrounding area.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 11 is a diagram illustrating an example of terminal information stored in a terminal information storage unit according to a first embodiment.

FIG. 12 is a diagram illustrating an (N×N) matrix for counting co-occurrence frequencies of all information processing terminals detected in a target period of group terminal extraction according to the first embodiment.

FIG. 13 is a diagram illustrating an example of a co-occurrence rate matrix according to the first embodiment.

FIG. 16 is a diagram illustrating an example of group information stored in the terminal information storage unit according to the first embodiment.

FIG. 17 is a diagram illustrating an example of a happiness coefficient according to the first embodiment.

FIG. 31 is a diagram illustrating an example of place information according to a third embodiment.

FIG. 32 is a diagram illustrating an example of a happiness coefficient corrected in accordance with a situation according to the third embodiment.

FIG. 36 is a diagram illustrating an example of a happiness coefficient according to the fourth embodiment.

MODE(S) FOR CARRYING OUT THE INVENTION

Figure 1:
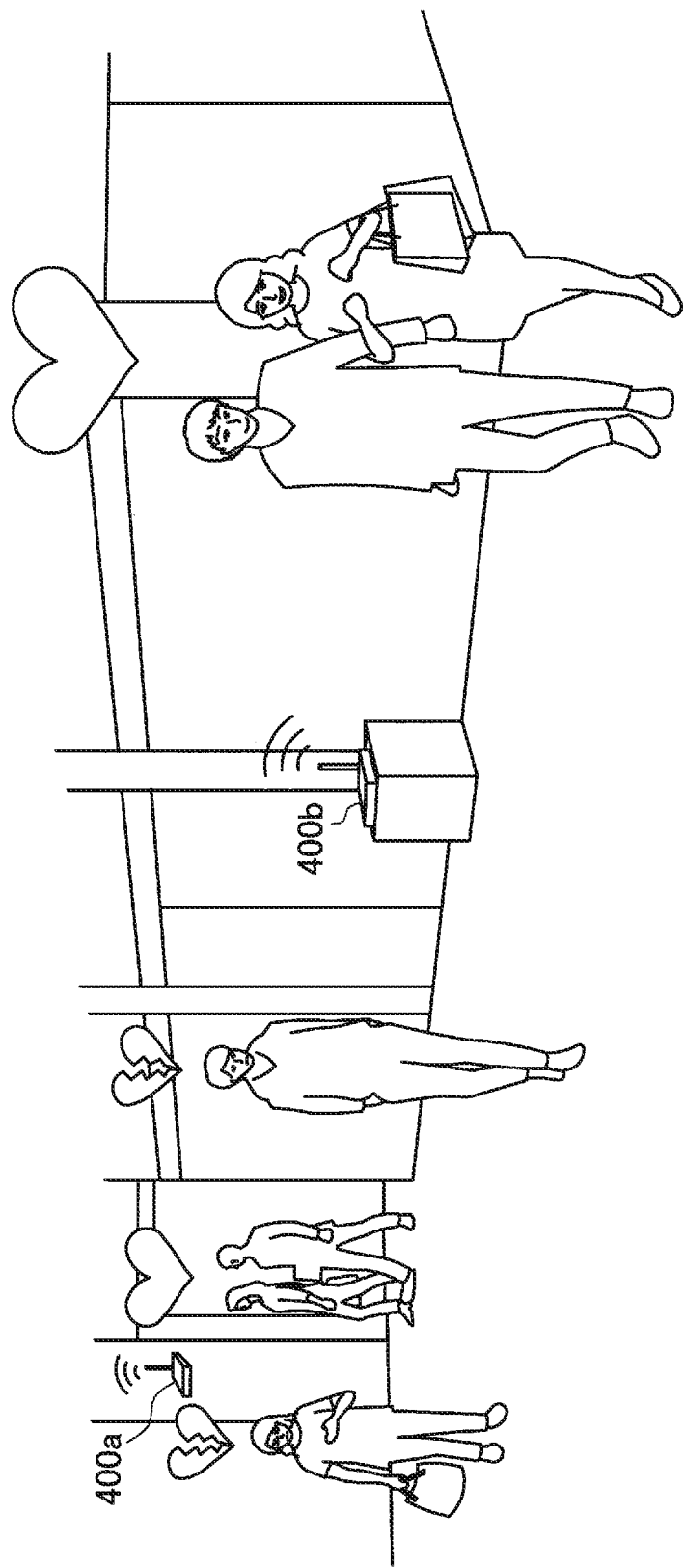
FIG. 1 is a diagram illustrating an overview of a happiness degree calculation system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Also, description will be given in the following order.
1. Overview of information processing system according to embodiment of present disclosure
2. Embodiments
2-1. First embodiment
(2-1-1. Embodiment 1A)
(2-1-2. Embodiment 1B)
(2-1-3. Embodiment 1C)
(2-1-4. Embodiment 1D)
(2-1-5. Group terminal extraction process)
(2-1-6. Happiness degree calculation process)
(2-1-7. Happiness degree display example)
2-2. Second embodiment
2-3. Third embodiment
(2-3-1. Embodiment 3A)
(2-3-2. Embodiment 3B)
(2-3-3. Embodiment 3C)
(2-3-4. Happiness degree calculation process in consideration of recognition situation)
2-4. Fourth embodiment
2-5. Hardware configuration
3. Conclusion

1. OVERVIEW OF INFORMATION PROCESSING SYSTEM ACCORDING TO EMBODIMENT OF PRESENT DISCLOSURE

First, the overview of the information processing system according to the embodiment of the present disclosure will be described with reference to FIG. 1. In the information processing system according to the present embodiment, quantified happiness is defined as a "degree of happiness" under the assumption that it is fun for two persons rather than a single person to spend time and it is possible to analyze behavior of a group in a certain place and calculate a degree of happiness in the place.

FIG. 1 is a diagram illustrating an overview of a happiness degree calculation system according to an embodiment of the present disclosure. In the happiness degree calculation system according to the present embodiment, an information processing terminal (not illustrated) possessed by a person who passes through the surroundings is first detected by a detection device 1a or 1b installed in various places such as, for example, a town, a station, a park, and a theme park. The information processing terminal is, for example, a mobile terminal such as a smartphone or a portable phone terminal, or a wearable terminal such as a smart watch, a smart band, a smart eyeglass, or a smart neck. Also, the detection devices 1a and 1b have a function of detecting an information processing terminal that emits radio waves of Wi-Fi (registered trademark), Bluetooth (registered trademark) low energy (BLE), and the like located in a surrounding area, and acquires terminal information such as a terminal ID or a radio wave intensity of the information processing terminal for each time stamp.

Next, the happiness degree calculation system extracts two information processing terminals located as a couple and three or more information processing terminals located as a group to generate group information on the basis of the terminal information detected by the detection device 1 and calculate a degree of happiness in a place around the detection device 1 on the basis of the group information. For example, a degree of happiness in a place where the number of couples and the number of groups of multiple people are large is calculated to be high. It is possible to easily recognize the degree of happiness of the place by presenting the calculated degree of happiness of the place together with a map image.

The overview of the happiness degree calculation system has been described above. Subsequently, a specific configuration and operation processing of the happiness degree calculation system will be described using a plurality of embodiments.

2. EMBODIMENTS

2-1. First Embodiment

In the happiness degree calculation system according to the first embodiment, terminal information acquired by detecting surrounding information processing terminals is stored together with a time stamp, group terminals that are likely to be located together are extracted from the stored terminal information, and the degree of happiness of the place around a detection device is calculated on the basis of the number of groups of group terminals. Thereby, it is possible to easily calculate the degree of happiness of the place. Also, because the detection device automatically detects the surrounding information processing terminal, it is possible to calculate the degree of happiness around a place simply by arranging the detection device in the place where measurement is desired. Also, it is possible to calculate the degree of happiness using the information processing terminals without causing an information processing terminal possessed by a user to execute specific processing such as positioning and without imposing an operational burden on the user.

The processing of the happiness degree calculation system according to the first embodiment as described above may be entirely implemented in an integrated information processing device 100, or may be of a cloud type in which a part of the processing is performed on a cloud (the server 200 side). Also, the terminal detection unit that detects the information processing terminals, the happiness degree calculation unit, and the display unit that displays the degree of happiness may respectively operate as separate devices (for example, the detection device 400, the server 200, and the display device 500). Hereinafter, after the description of the configuration example of the happiness degree calculation system according to the first embodiment and the operation processing thereof (Embodiments 1A to 1D), specific methods of a group terminal extraction process and a happiness degree calculation process using the terminal information will be described and finally an example of a display screen of a degree of happiness will be described using a specific example.

2-1-1. Embodiment 1A (Configuration)

Figure 2:
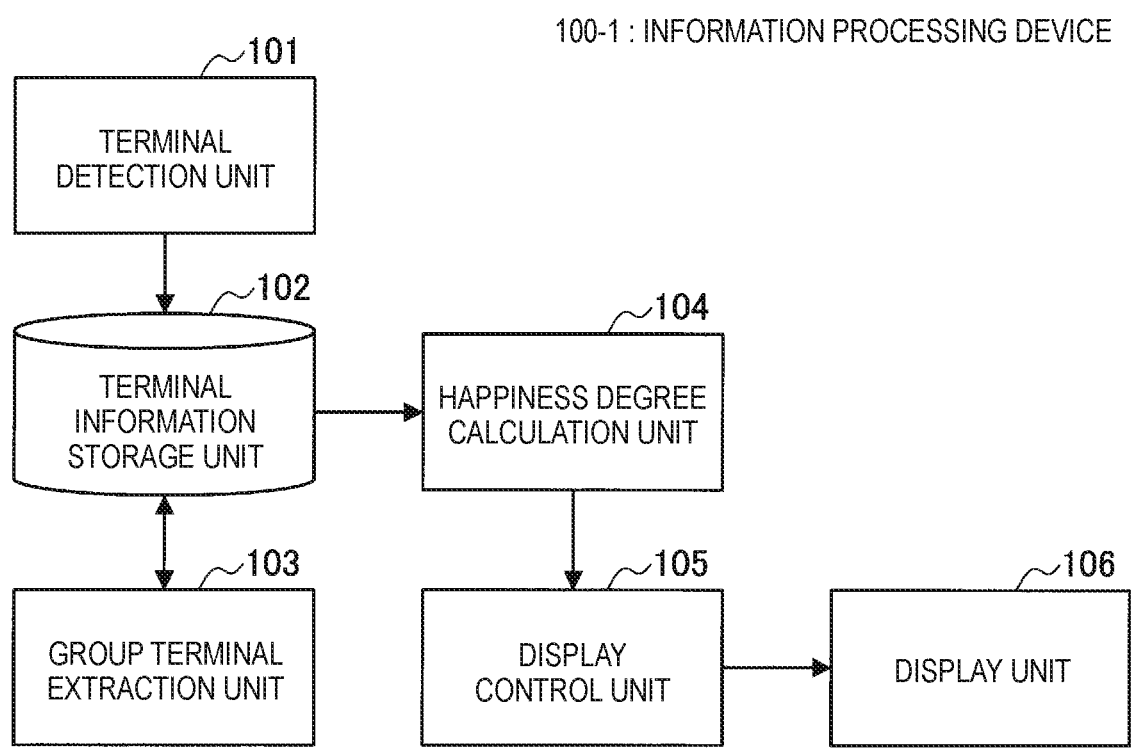
FIG. 2 is a diagram illustrating a functional configuration example of an information processing device according to Embodiment 1A.

First, a configuration of an information processing device 100-1 according to Embodiment 1A of the present disclosure will be described with reference to FIG. 2. FIG. 2 is a diagram illustrating a functional configuration example of the information processing device 100-1 according to the first embodiment of the present disclosure. The information processing device 100-1 can be implemented by, for example, a portable terminal device or a stationary terminal device such as a digital sign.

As illustrated in FIG. 2, the information processing device 100-1 includes a terminal detection unit 101, a terminal information storage unit 102, a group terminal extraction unit 103, a happiness degree calculation unit 104, a display control unit 105, and a display unit 106.

The terminal detection unit 101 detects terminal information of surrounding information processing terminals. Specifically, for example, an information processing terminal that generates radio waves of Wi-Fi or BLE or the like in a surround areas is detected, and terminal information such as a terminal ID and a radio wave intensity of the information processing terminals is acquired for each time stamp.

The terminal information storage unit 102 stores the terminal information output from the terminal detection unit 101 and the group information output from the group terminal extraction unit 103.

On the basis of the terminal information stored in the terminal information storage unit 102, the group terminal extraction unit 103 extracts information about two information processing terminals located as a couple and information about three or more information processing terminals located as a group (referred to as group information). A specific method of extracting group terminals will be described below.

The happiness degree calculation unit 104 calculates the degree of happiness of the place around the information processing device 100-1 on the basis of the group information. A specific method of calculating the degree of happiness will be described below.

The display control unit 105 controls information display in the display unit 106. Specifically, the display control unit 105 performs control so that a screen indicating the degree of happiness calculated by the happiness degree calculation unit 104 (for example, a map image in which an icon indicating the degree of happiness is displayed in a superimposed manner or the like) is generated and displayed on the display unit 106.

The display unit 106 is implemented by, for example, a liquid crystal display or the like, and displays a screen indicating the calculated degree of happiness under the control of the display control unit 105.

(Operation Processing)

Figure 3:
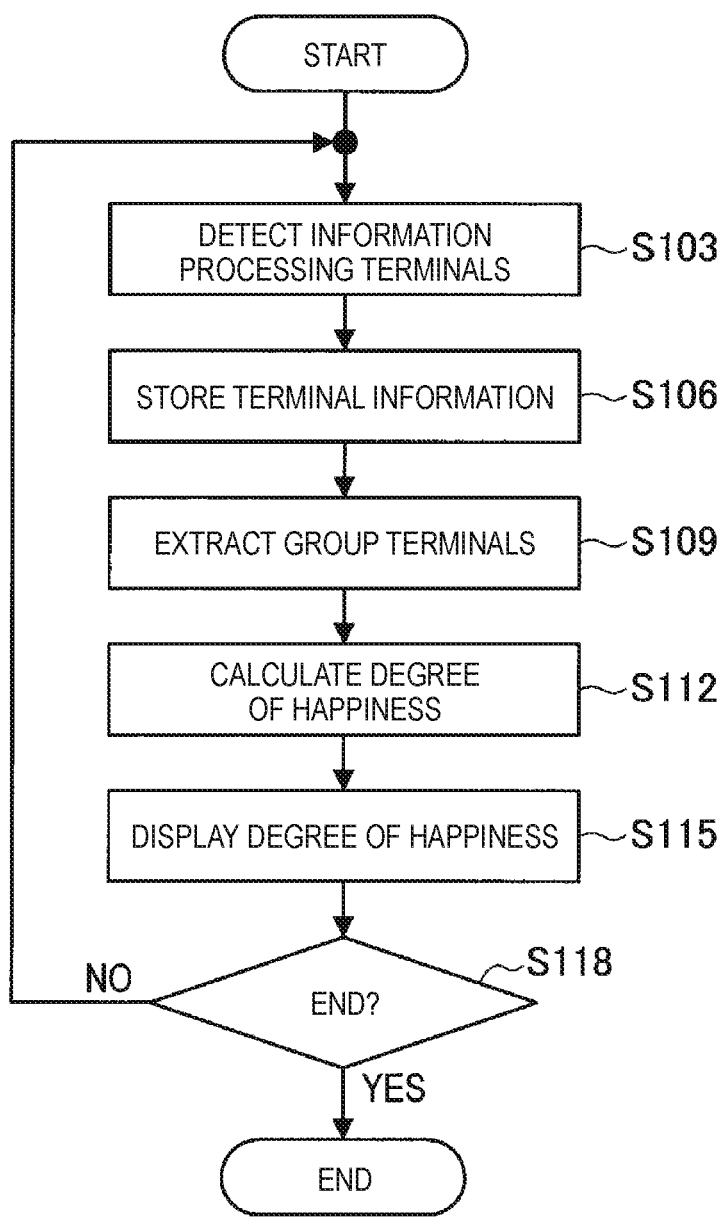
FIG. 3 is a flowchart illustrating a happiness degree display process according to Embodiment 1A.

Next, control of display of the degree of happiness by the information processing device 100-1 will be described with reference to FIG. 3. FIG. 3 is a flowchart illustrating a process of displaying the degree of happiness of the information processing device 100-1 according to the first embodiment.

As illustrated in FIG. 3, the terminal detection unit 101 of the information processing device 100-1 first detects an information processing terminal located in a surrounding area (S103). For example, in the case of a digital sign in which the information processing device 100-1 is installed in the town, the information processing device 100-1 detects Wi-Fi radio waves or the like transmitted from the information processing terminal possessed by a person who passes through a surrounding area and acquires terminal information such as a terminal ID or a radio wave intensity of the information processing terminal.

Next, the terminal detection unit 101 stores the detected terminal information in the terminal information storage unit 102 (S106).

Next, the group terminal extraction unit 103 extracts group terminals on the basis of the terminal information stored in the terminal information storage unit 102, and generates group information (S109).

Next, the happiness degree calculation unit 104 calculates a degree of happiness on the basis of the group information generated by the group terminal extraction unit 103 (S112).

Subsequently, the display control unit 105 causes the display unit 106 to display the degree of happiness calculated by the happiness degree calculation unit 104 (S115).

Then, the above-described processing of S103 to S115 is iterated until termination of the happiness degree display process by the information processing device 100-1 is indicated (S118).

(Effects)

As described above, the information processing device 100-1 implemented by the digital sign or the like can calculate a degree of happiness around a place where the information processing device 100-1 is installed and cause the display unit 106 to display the degree of happiness.

2-1-2. Embodiment 1B

Next, Embodiment 1B will be described. An information processing device 100-2 according to the present embodiment can receive the degree of happiness from an information processing device 100-2 installed in another place and display the received degree of happiness together with a degree of happiness around the place where the information processing device 100-2 is installed.

Figure 4:
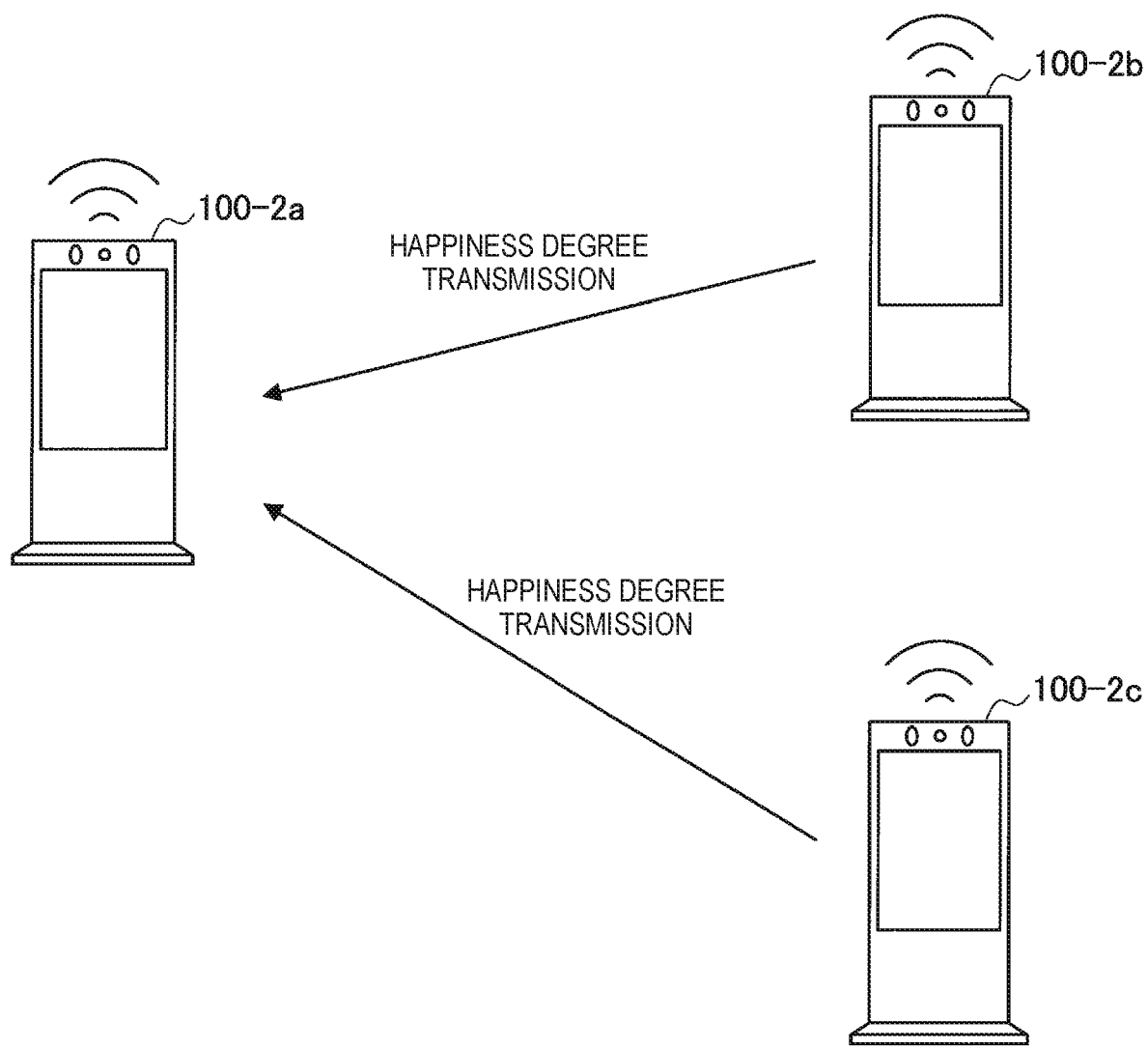
FIG. 4 is a diagram illustrating reception of a degree of happiness from another information processing device in Embodiment 1B.

FIG. 4 is a diagram illustrating the reception of the degree of happiness from the other information processing device 100-2 according to the present embodiment. As illustrated in FIG. 4, in a case where all information processing devices 100-2a, 100-2b, and 100-2c are implemented by a digital sign and installed at different places, for example, the information processing device 100-2a receives degrees of happiness calculated in the devices from the information processing devices 100-2b and 100-2c. Thereby, the information processing device 100-2a can present the degree of happiness in the place where the information processing devices 100-2b and 100-2c are installed. The functional configuration and operation processing of the present embodiment will be described below using FIGS. 5 and 6.

(Configuration)

Figure 5:
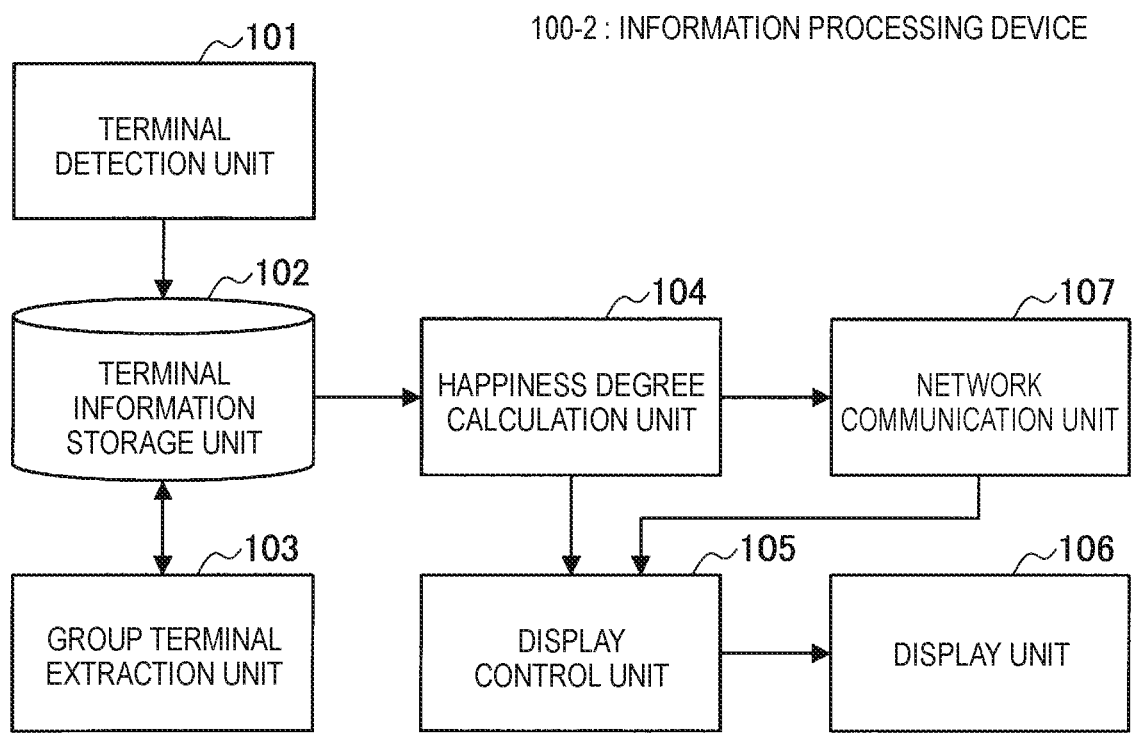
FIG. 5 is a diagram illustrating a functional configuration example of an information processing device according to Embodiment 1B.

FIG. 5 is a diagram illustrating a functional configuration example of the information processing device 100-2 according to the present embodiment. As illustrated in FIG. 5, the information processing device 100-2 includes a terminal detection unit 101, a terminal information storage unit 102, a group terminal extraction unit 103, a happiness degree calculation unit 104, a display control unit 105, a display unit 106, and a network communication unit 107.

The network communication unit 107 exchanges data with the other information processing devices 100-2 via a network. For example, the network communication unit 107 receives and transmits the degree of happiness from the other information processing devices 100-2.

The display control unit 105 performs control so that the degree of happiness of the place around its own device calculated by the happiness degree calculation unit 104 and the degree of happiness of the place surrounding another information processing device 100-2 received by the network communication unit 107 are displayed on the display unit 106. At this time, the display control unit 105 may display the degree of happiness of each place on the map image.

Because the functions of other components are similar to those with the same reference signs described with reference to FIG. 2, the description thereof will be omitted. The omission of the description of the functional components is true for each of the following embodiments.

(Operation Processing)

Figure 6:
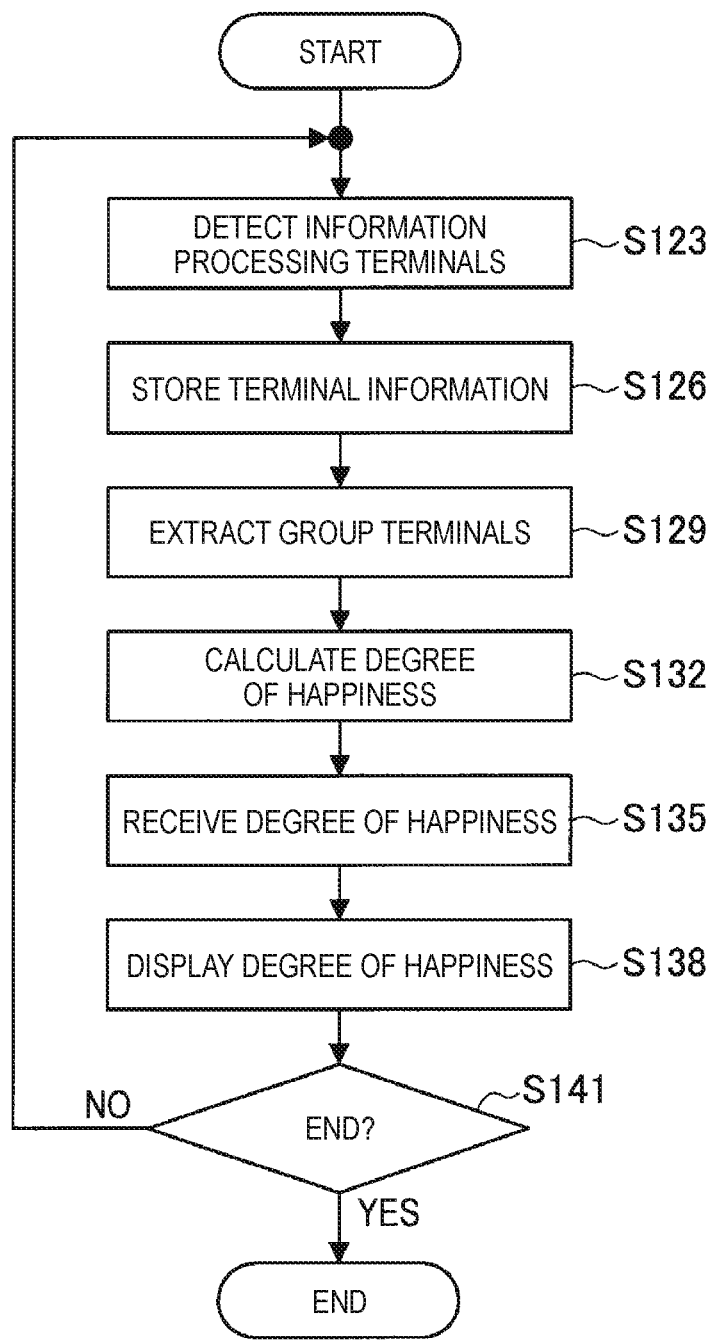
FIG. 6 is a flowchart illustrating a happiness degree display process according to Embodiment 1B.

Next, the operation processing of the present embodiment will be described with reference to FIG. 6. FIG. 6 is a flowchart illustrating a process of displaying the degree of happiness of the information processing device 100-2 according to the present embodiment.

As illustrated in FIG. 6, the information processing device 100-2 first detects surrounding information processing terminals, stores terminal information acquired from the detected information processing terminals, extracts group terminals from a large number of pieces of the stored terminal information, and calculates a degree of happiness around the information processing device 100-2 (S123 to S132).

Next, the network communication unit 107 of the information processing device 100-2 receives the degree of happiness from the other information processing devices 100-2 (S135). The degree of happiness from the other information processing devices 100-2 may be periodically acquired by sending an inquiry to the other information processing devices 100-2 or may be acquired after waiting for transmission from the other information processing devices 100-2.

Next, the display control unit 105 causes the display unit 106 to display the degree of happiness around its own device and the degree of happiness around the places where the other information processing devices 100-2 are installed (S138). Specifically, for example, the display control unit 105 may superimpose and display the degree of happiness of each place on the corresponding map image so that it is possible to easily ascertain the degree of happiness at any place.

Then, the above-described processing from S123 to S138 is iterated until termination of the happiness degree display process in the information processing device 100-2 is indicated (S141).

(Effects)

As described above, the information processing device 100-2 implemented by a digital sign or the like, for example, can display degrees of happiness around the place where the information processing device 100-2 is installed and another place on the display unit 106.

2-1-3. Embodiment 1C

Next, Embodiment 1C according to the present disclosure will be described. In the above-described Embodiments 1A and 1B, the information processing device 100 calculates the degree of happiness. However, the configuration of the first embodiment is not limited thereto. For example, the degree of happiness may be calculated using a cloud on the server side. Hereinafter, the happiness degree calculation system for calculating the degree of happiness on the server side will be described with reference to FIGS. 7 and 8.
(Configuration)

Figure 7:
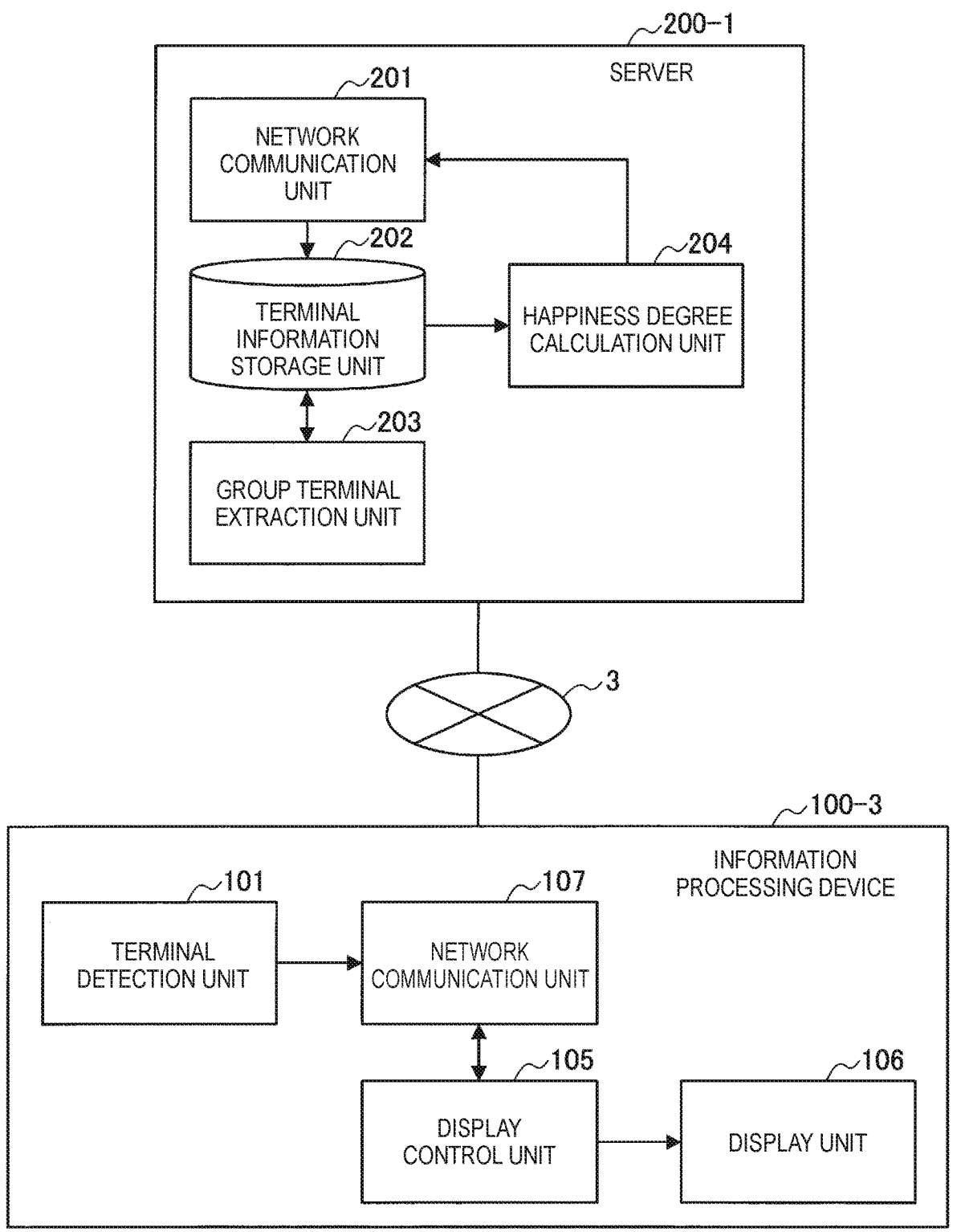
FIG. 7 is a diagram illustrating a functional configuration example of a happiness degree calculation system according to Embodiment 1C.

FIG. 7 is a diagram illustrating a functional configuration of a happiness degree calculation system according to the present embodiment. As illustrated in FIG. 7, the happiness degree calculation system according to the present embodiment includes an information processing device 100-3 and a server 200-1, and the devices are connected via a network 3. The information processing device 100-3 is implemented by, for example, a digital sign.

The information processing device 100-3 includes a terminal detection unit 101, a network communication unit 107, a display control unit 105, and a display unit 106. The network communication unit 107 transmits terminal information of an information processing terminal detected by the terminal detection unit 101 to the server 200-1 together with a detection device ID of the information processing device 100-3 for each time stamp. The display control unit 105 performs control so that the display unit 106 displays the degree of happiness calculated by the server 200-1 received by the network communication unit 107.

The server 200-1 includes a network communication unit 201, a terminal information storage unit 202, a group terminal extraction unit 203, and a happiness degree calculation unit 204. The terminal information storage unit 202 stores the terminal information transmitted from the information processing device 100-3 and received by the network communication unit 201 (specifically, the terminal information linked with the time stamp and the detection device ID). The group terminal extraction unit 203 extracts information processing terminals which are likely to be located together (that is, for a user who is performing a group action) as group terminals from the terminal information stored in the terminal information storage unit 202, and stores information about the group terminals (i.e., group information) in the terminal information storage unit 202. The happiness degree calculation unit 204 calculates a degree of happiness of a place around the information processing device 100-3 on the basis of the group information generated by the group terminal extraction unit 203 and stored in the terminal information storage unit 202. The calculated degree of happiness is returned to the information processing device 100-3 through the network communication unit 201. The server 200-1 may generate screen information for displaying the degree of happiness (for example, information about a screen on which an icon indicating the degree of happiness is superimposed and displayed on the map image) and transmit the screen information to the information processing device 100-3.
(Operation Processing)

Figure 8:
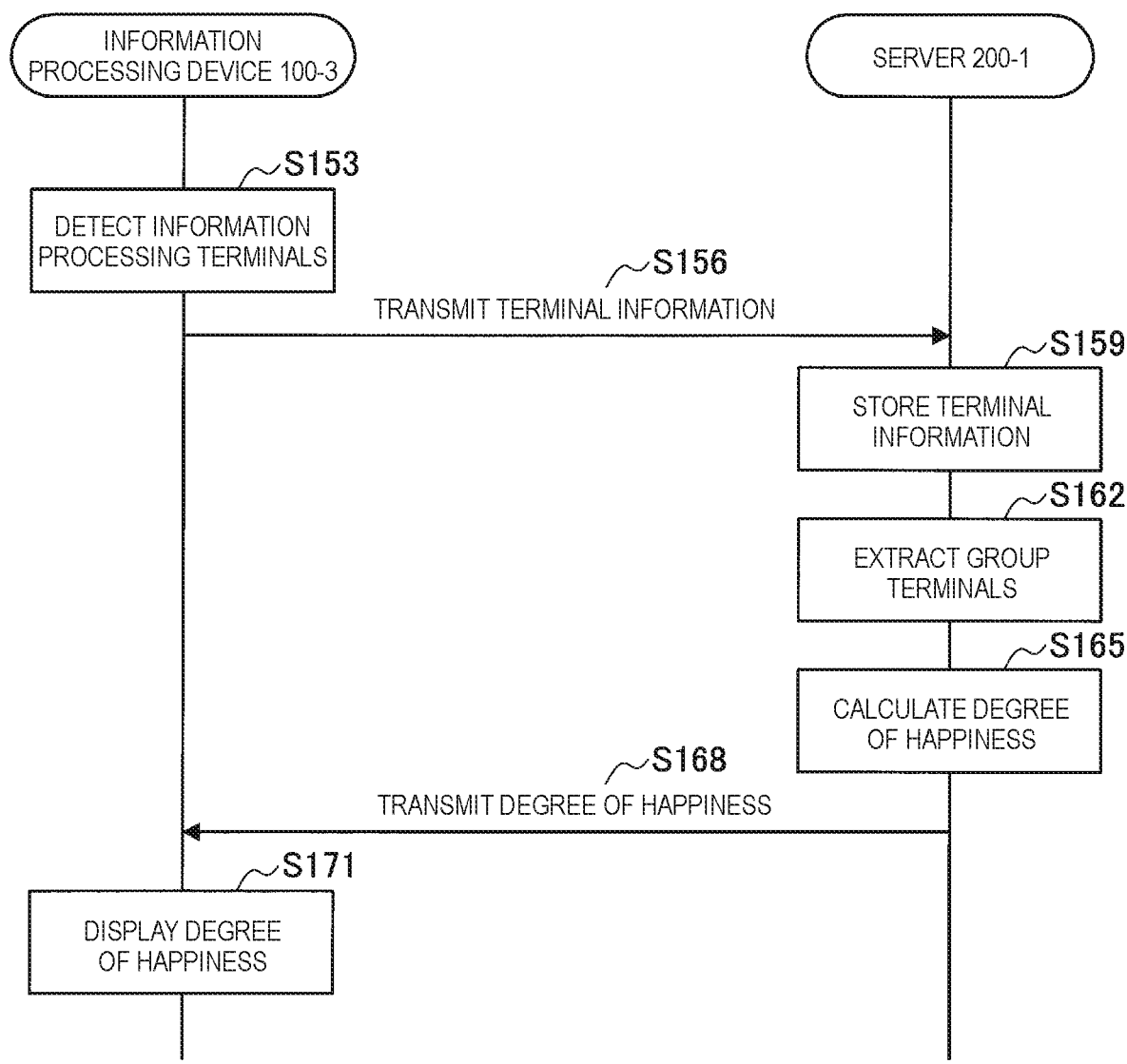
FIG. 8 is a flowchart illustrating a happiness degree display process according to Embodiment 1C.

FIG. 8 is a flowchart illustrating the degree of happiness display process according to the present embodiment. As illustrated in FIG. 8, the information processing device 100-3 first detects surrounding information processing terminals (S153), and transmits terminal information acquired from the detected information processing terminals to the server 200-1 via the network 3 (S156).

Next, the server 200-1 stores the terminal information transmitted from the information processing device 100-3 in the terminal information storage unit 202 (S159).

Next, the server 200-1 extracts group terminals from the stored terminal information using the group terminal extraction unit 203 (S162), and the happiness degree calculation unit 204 calculates a degree of happiness around the information processing device 100-3 (S165).

Next, the network communication unit 201 of the server 200-1 transmits the degree of happiness to the information processing device 100-3 (S168).

Then, the display control unit 105 of the information processing device 100-3 causes the display unit 106 to display the degree of happiness transmitted from the server 200-1 (S171). In the present embodiment, the server 200-1 may transmit a degree of happiness in another place to the information processing device 100-3 in addition to the degree of happiness around the information processing device 100-3. Thereby, the information processing device 100-3 can display the degree of happiness in the other place as well as the degree of happiness around the information processing device 100-3.
(Effects)

As described above, in Embodiment 1C, processing such as group terminal extraction and calculation of a degree of happiness can be performed on the cloud. In this case, because the group terminal extraction unit 203 of the server 200-1 can refer to terminal information acquired in a plurality of places when group terminals which are likely to be located together are extracted, it is possible to improve the accuracy of the group terminal extraction. For example, in a case where a combination of information processing terminals detected together in a certain place is also detected in other places, the information processing terminals are more likely to be group terminals.

2-1-4. Embodiment 1D

Subsequently, Embodiment 1D according to the present disclosure will be described. In the present embodiment, the group terminal extraction function and the happiness degree calculation function are performed on the server 200 side by using the cloud, and the terminal detection function and the happiness degree display function are implemented separately. The number of detection devices 400 having the terminal detection function may be one or more. This will be specifically described with reference to FIGS. 9 and 10.
(Configuration)

Figure 9:
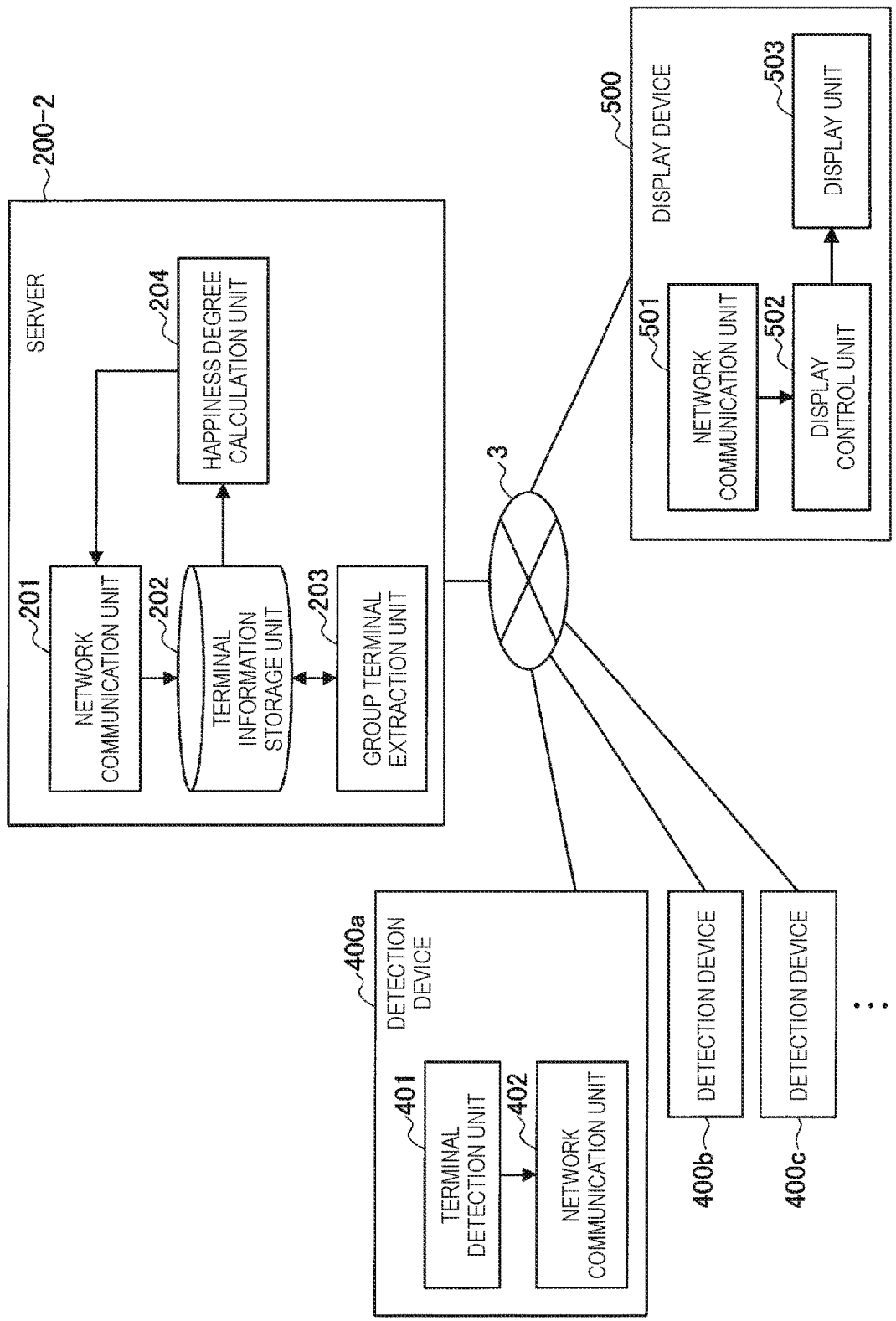
FIG. 9 is a diagram illustrating a functional configuration example of a happiness degree calculation system according to Embodiment 1D.

FIG. 9 is a diagram illustrating a functional configuration example of the happiness degree calculation system according to the present embodiment. As illustrated in FIG. 9, the happiness degree calculation system according to the present embodiment includes a detection device 400 (400a, 400b, 400c, . . . ), a server 200-2, and a display device 500 and the devices are connected via a network 3. The display device 500 is implemented by, for example, a digital sign, a portable terminal, or the like.

The detection device 400 is a monitoring node having a terminal detection unit 401 and a network communication unit 402. The network communication unit 402 transmits the terminal information of the information processing terminals detected by the terminal detection unit 401 to the server 200-2 together with the detection device ID of the detection device 400 for each time stamp. Also, as illustrated in FIG. 9, the number of detection devices 400 may be two or more. In this case, the plurality of detection devices 400a, 400b, and 400c are arranged within a fixed range (for example, an event site, a theme park, a station premises, or the like) which is the observation target of the degree of happiness.

The server 200-2 has a configuration similar to that of the server 200-1 of Embodiment 1C described with reference to FIG. 7. The terminal information storage unit 202 stores terminal information (more specifically, terminal information linked with a time stamp and a detection device ID) transmitted from the detection device 400 (400a, 400b, 400c, . . . ) and received by the network communication unit 201. The happiness degree calculation unit 204 calculates the degree of happiness of each place around each detection device 400 on the basis of the group information generated by the group terminal extraction unit 203 and stored in the terminal information storage unit 202. The calculated degree of happiness is transmitted to the display device 500 through the network communication unit 201, for example, in association with the detection device ID (or latitude and longitude) of each detection device 400. The server 200-2 may generate screen information for displaying the degree of happiness (for example, information about a screen on which an icon indicating the degree of happiness is superimposed and displayed on the map image) and transmit the screen information to the display device 500.

The display device 500 includes a network communication unit 501, a display control unit 502, and a display unit 503. The display control unit 502 performs control so that the degree of happiness calculated by the server 200-2 received by the network communication unit 501 is displayed on the display unit 503.

(Operation Processing)

Figure 10:
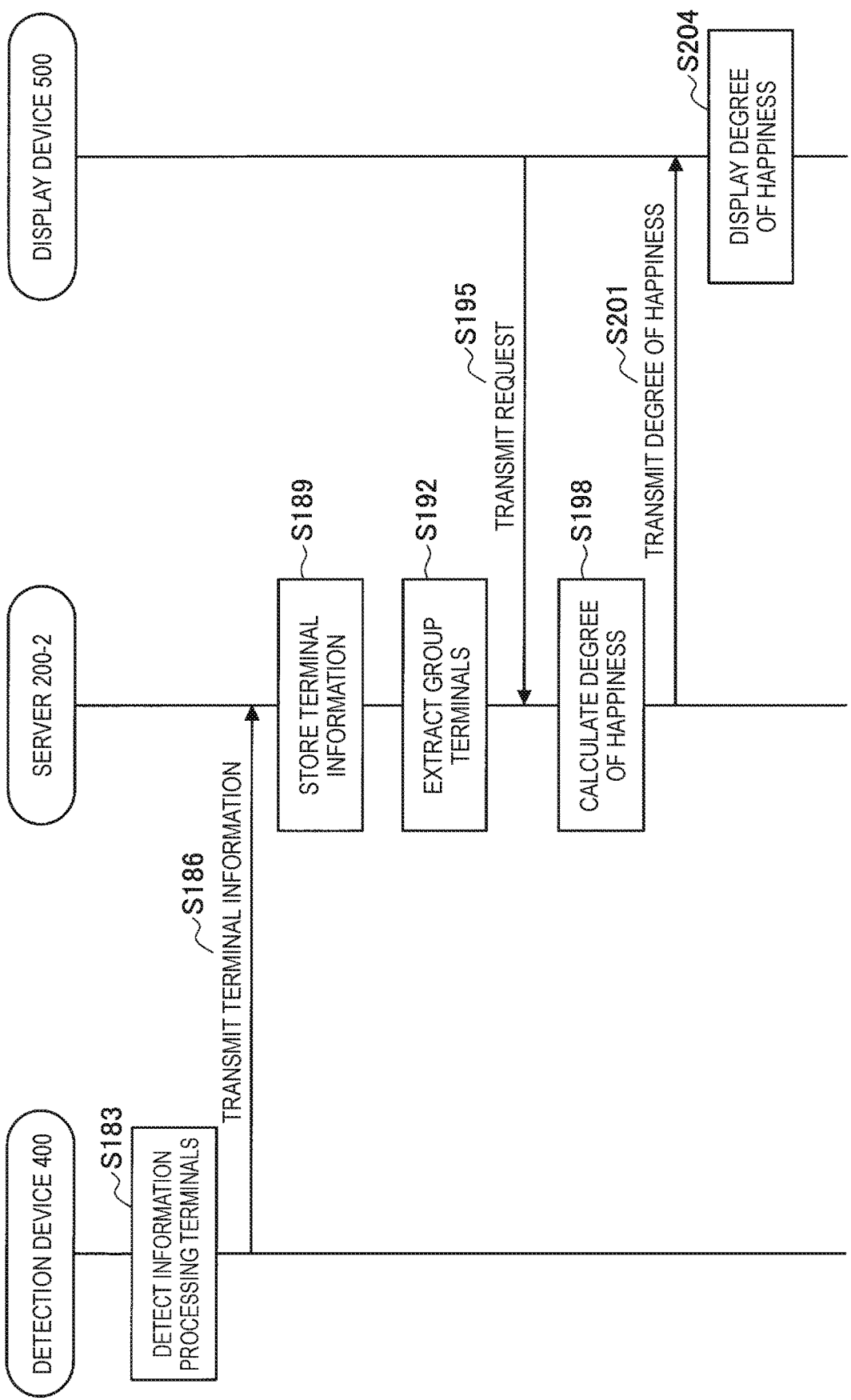
FIG. 10 is a flowchart illustrating a happiness degree display process according to Embodiment 1D.

FIG. 10 is a flowchart illustrating a happiness degree display process according to the present embodiment. As illustrated in FIG. 10, the detection device 400 first detects surrounding information processing terminals (S183), and transmits terminal information acquired from the detected information processing terminals to the server 200-2 via the network 3 (S186).

Next, the server 200-2 stores the terminal information transmitted from the detection device 400 in the terminal information storage unit 202 (S189).

Next, the server 200-2 extracts group terminals from the stored terminal information using the group terminal extraction unit 203 (S192).

Next, when a happiness degree transmission request is transmitted from the display device 500 (S195), the server 200-2 calculates a degree of happiness around the detection device 400 (or within a fixed range in which the plurality of detection devices 400a, 400b, and 400c are arranged) using the happiness degree calculation unit 204 (S198).

Subsequently, the network communication unit 201 of the server 200-2 transmits the degree of happiness to the display device 500 (S201).

Then, the display control unit 502 of the display device 500 causes the display unit 503 to display the degree of happiness transmitted from the server 200-2 (S204). Specifically, the display control unit 502 performs control so that the degree of happiness around a place where the detection device 400 is arranged is displayed. In a case where the detection device 400 is arranged around the display device 500, the display control unit 502 may display the degree of happiness transmitted from the server 200-2 as the degree of happiness around its own device. Also, in a case where the display device 500 also receives the degree of happiness in another place from the server 200-2, the degree of happiness of the other place can also be displayed, for example, together with the map image.

(Effects)

As explained above, in Embodiment 1D, processing such as group terminal extraction and calculation of a degree of happiness is performed on the cloud, and the detection function and the display function of the information processing terminal can be implemented separately. It is also possible to arrange a plurality of devices (detection devices 400) having a detection function. For example, when the degree of happiness of a place within a fixed range such as an event site is calculated, it is possible to improve the accuracy of the group terminal extraction and more accurately calculate the degree of happiness by arranging a plurality of detection devices 400 by which the detection range is made smaller in various places of the event site.

2-1-5. Group Terminal Extraction Process

A plurality of configuration examples and operation processing of the happiness degree calculation system according to the first embodiment have been specifically described above. Subsequently, group terminal extraction methods of the group terminal extraction units 103 and 203 of the above-described configurations will be specifically described with reference to FIGS. 11 to 16. Here, the group terminal extraction method in the group terminal extraction unit 203 of the server 200 will be representatively described.

The group terminal extraction unit 203 extracts, as the group terminals, two information processing terminals located as a couple and three or more information processing terminals located as a group from the terminal information stored in the terminal information storage unit 202. Specifically, for example, the group terminal extraction unit 203 may count the information processing terminals detected simultaneously for each time stamp as a co-occurrence frequency, and extract the group terminals by using a magnitude of the co-occurrence rate.

For example, if a frequency at which terminal X is detected is |X|, a frequency at which terminal Y is detected is |Y|, and a co-occurrence frequency at which terminal X and terminal Y are simultaneously detected is |X∩Y| in certain data, the co-occurrence rate based on a Dice coefficient is obtained by the following Formula 1.

[Math. 1]

$$\frac{2|X \cap Y|}{|X| + |Y|} \qquad \text{Formula 1}$$

Although there are various methods of calculating the co-occurrence rate, the co-occurrence rate based on the Dice coefficient having a largest value (1.0) is used as an example when terminals for which the co-occurrence frequency |X∩Y| is high and the frequencies of |X| and |Y| are similar, that is, terminals constantly located together, are desired to be extracted in the group terminal extraction according to the present embodiment.

Here, an example of the terminal information stored in the terminal information storage unit 202 is illustrated in FIG. 11. As illustrated in FIG. 11, a time stamp, a detection device ID (identification information of a device that has performed detection), and a terminal ID list (a list of identification information of the detected information processing terminals) are associated and stored in the terminal information storage unit 202. In the example illustrated in FIG. 11, a list of terminal IDs detected in the same time period for each time stamp is enumerated in one detection device (a detection device ID: MN0F876E6D). Here, the time stamp indicates an observation time, but may indicate, for example, a start time of an observation time of several seconds to several tens of seconds. Also, the time stamp illustrated in FIG. 11 is indicated by a UNIX (registered trademark) time obtained by counting the number of elapsed seconds from a predetermined reference time as an example, but the form of time stamp according to the present embodiment is not limited thereto.

In a case where group terminals are extracted in a certain period on the basis of such stored terminal information, the group terminal extraction unit 203 first sets the total number of terminals detected in the period to N, and generates an (N×N) matrix for counting a co-occurrence frequency n between terminals (that is, a combination of two) among information processing terminals $P_1$ to $P_N$. Here, FIG. 12 illustrates an (N×N) matrix for counting co-occurrence frequencies of all the information processing terminals detected for a target period of group terminal extraction.

For example, in a case where terminal information as illustrated in FIG. 11 is used, because three information processing terminals "4E14D94C, E26DBA29, and 42CC63CE" are detected by the detection device MN0F876E6D at the time of the time stamp 1421821080 included in the target period of group terminal extraction, the group terminal extraction unit 203 adds three combinations such as "4E14D94C·E26DBA29," "4E14D94C·42CC63CE," and "E26DBA29·42CC63CE" as candidates for couple terminals to the co-occurrence frequencies.

When the co-occurrence frequencies have been added to all the time stamps (for example, a plurality of time stamps in a single detection device) in the target period of group terminal extraction, the group terminal extraction unit 203 then calculates the co-occurrence rate. Specifically, for example, the group terminal extraction unit 203 extracts a co-occurrence rate $c_{ij}$ (=$c_{ji}$) between an information processing terminal $P_i$ and the information processing terminal $P_j$ according to the following Formula 2 on the basis of a co-occurrence frequency $n_{ii}$ of the information processing terminal $P_i$, a co-occurrence frequency $n_{jj}$ of the information processing terminal $P_j$, and a co-occurrence frequency $n_{ij}$ (=$n_{ji}$) between the information processing terminal $P_i$ and the information processing terminal $P_j$.

[Math. 2]

$$c_{ij} = \frac{2n_{ij}}{n_{ii} + n_{jj}} \quad \text{Formula 2}$$

An example of the co-occurrence rate matrix thus calculated is illustrated in FIG. 13. As illustrated in FIG. 13, for example, co-occurrence rates of combinations such as a co-occurrence rate $c_{12}$ (=$c_{21}$) between an information processing terminal $P_i$ and an information processing terminal $P_2$ and a co-occurrence rate $C_{13}$ (=$c_{31}$) between the information processing terminal $P_i$ and an information processing terminal $P_3$ are calculated.

Next, the group terminal extraction unit 203 extracts a combination of information processing terminals having a high co-occurrence rate as candidates for couple terminals from the co-occurrence rate matrix as illustrated in FIG. 13. At this time, the group terminal extraction unit 203 may provide a co-occurrence rate threshold value Cth and a co-occurrence frequency threshold value Nth and may be configured to extract a combination of information processing terminals for which the co-occurrence rate is greater than the threshold Cth and the co-occurrence frequency is greater than the threshold value Nth. Thereby, it is possible to exclude a combination of other persons who have just walked together by chance from couple terminals. An example of candidates for couple terminals extracted as described above is illustrated in the upper part of FIG. 14. In the upper part of FIG. 14, terminal IDs of the extracted candidates for the couple terminals are enumerated.

Figure 14:
FIG. 14 is a diagram illustrating an example in which a group terminal is separated from couple terminal candidates according to the first embodiment.

Subsequently, the group terminal extraction unit 203 separates group terminals (in a broad sense) including two couple terminals and three or more group terminals (in a narrow sense) from couple terminal candidates as illustrated in an upper part of FIG. 14. An example of a separated group terminal (in a broad sense) is illustrated in a lower part of FIG. 14. Specifically, for example, the group terminal extraction unit 203 can set combinations including the same terminal among couple terminal candidates as group terminals constituted of three or more terminals including the same terminal if the threshold value Cth of the co-occurrence rate is sufficiently high. For example, because "03E3FE7B·A1C233B8," "03E3FE7B·AA5666A8," "03E3FE7B·C1667DC9," and "03E3FE7B·E08C7B31" among the couple terminal candidates illustrated in the upper part of FIG. 14 are combinations including the same terminal 03E3FE7B, the terminals are determined to be group terminals including at least the terminals "03E3FE7B, A1C233B8, AA5666A8, C1667DC9, and E08C7B31." Thus, for example, as illustrated in the lower part of FIG. 14, five couple terminal sets, three group terminal sets, each including three terminals, and one group terminal set including four or more terminals are separated from the couple terminal candidates.

In the present embodiment, the couple terminal candidates are first extracted and couple terminals and group terminals (in a narrow sense) are subsequently separated from the couple terminal candidates as described above, so that it is possible to separate all group terminals (in a broad sense) with the burden of an amount of calculation being reduced compared with separately calculating three or more co-occurrence rates again.

Figure 15:
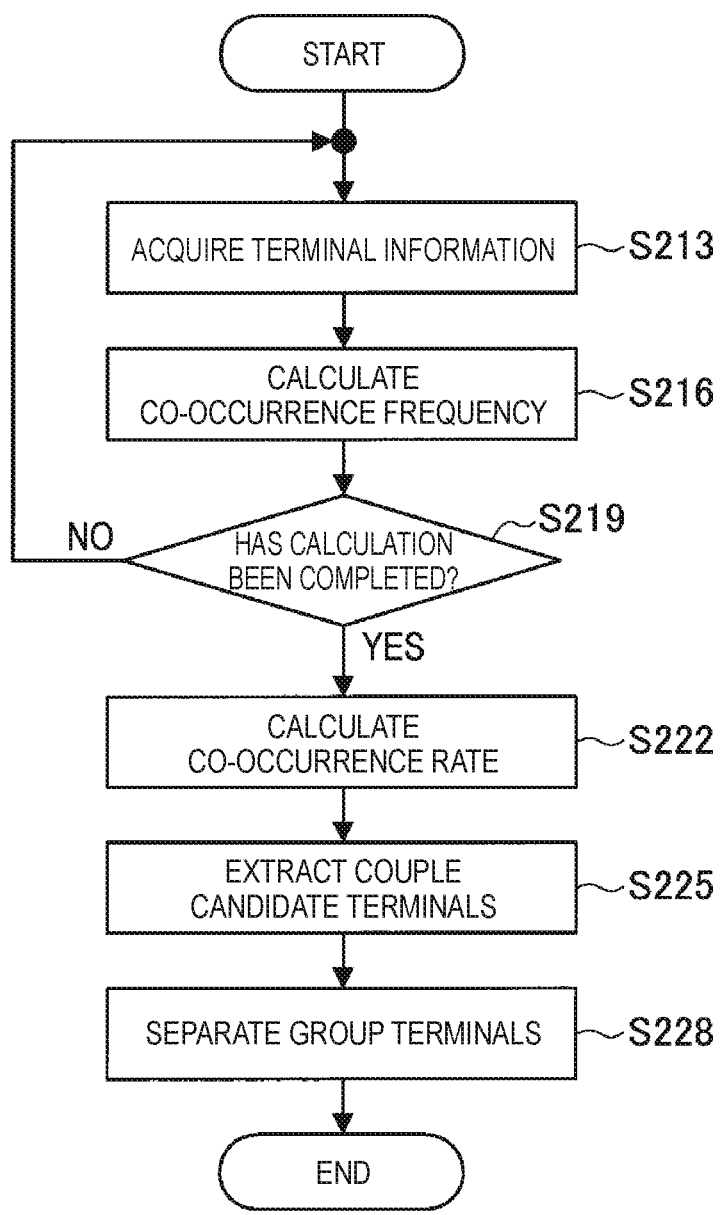
FIG. 15 is a flowchart illustrating a group terminal extraction process according to the first embodiment.

The above-described group terminal extraction process will be described with reference to the flowchart illustrated in FIG. 15. FIG. 15 is a flowchart illustrating the group terminal extraction process according to the first embodiment.

As illustrated in FIG. 15, the group terminal extraction unit 203 first acquires terminal information in the extraction target period from the terminal information storage unit (S213) and calculates the co-occurrence frequency of each terminal (S216).

Next, when calculation of all the co-occurrence frequencies of the information processing terminals detected in the same time period in the extraction target period is completed (S219/Yes), the group terminal extraction unit 203 calculates the co-occurrence rate of each terminal (S222).

Next, the group terminal extraction unit 203 extracts couple terminal candidates on the basis of the calculated co-occurrence rate (S225) and separates group terminals (in a broad sense) including couple terminals from the extracted couple terminal candidates (S228).

The group terminal extraction by the group terminal extraction unit 203 has been specifically described above. Information about the extracted group terminals (group information) can be stored in the terminal information storage unit 202.

2-1-6. Happiness Degree Calculation Process

Next, happiness degree calculation methods of the happiness degree calculation units 104 and 204 having the configurations described above will be specifically described with reference to FIGS. 16 and 17. Here, the happiness degree calculation method of the happiness degree calculation unit 204 provided in the server 200 will be described as a representative.

FIG. 16 is a diagram illustrating an example of the group information stored in the terminal information storage unit 202. In the illustrated example, information about group terminals extracted during a predetermined observation time (from $t_1$ to $t_2$) (for example, which is several days and includes a plurality of time stamps) is shown for each detection device ID. In other words, the number of couple terminals $N_2$ appearing during a predetermined observation time around the installation place of each detection device ID, the number of group terminals $N_3$, each including three terminals, and the number of group terminals $N_4$ including four or more terminals are shown. For example, referring to the first row in FIG. 16, it can be seen that five couple terminal sets, three group terminal sets, each including three terminals, and one group terminal set including four or more terminals have been detected around the detection device MN0F876E6D.

The happiness degree calculation unit 204 calculates the degree of happiness around the installation place of each detection device on the basis of such group information. Specifically, the happiness degree calculation unit 204 calculates the degree of happiness, for example, according to the following Formula 3, on the basis of the number of group terminals (that is, the number of groups) extracted by the group terminal extraction unit 203 and the happiness coefficient.

[Math. 3]

$$h = (\text{Happiness coefficient} \times \text{Number of groups } N_2) + \\ (\text{Happiness coefficient} \times \text{Number of groups } N_3) + \\ (\text{Happiness coefficient} \times \text{Number of groups } N_4)$$

Formula 3

Here, an example of the happiness coefficient is illustrated in FIG. 17. In the illustrated example, for example, the happiness coefficient for two group terminals (couple terminals) is designated as 2.0, the happiness coefficient for three group terminals is designated as 1.0, and the happiness coefficient for four or more group terminals is designated as 0.5.

The happiness degree calculation unit 204 calculates a degree of happiness h around the detection device MN0F876E6D according to the following Formula 3 on the basis of such a degree of happiness and the group information of the detection device MN0F876E6D shown in the first row in FIG. 16. That is, because there are five couple terminal sets, each including two terminals, three group terminal sets, each including three terminals, and one group terminal set including four or more terminals in the group information of the detection device MN0F876E6D, the degree of happiness h is calculated as "13.5" according to the following Formula 4.

[Math. 4]

$$h = 2.0 \times 5 + 1.0 \times 3 + 0.5 \times 1$$

Formula 4

Happiness degree calculation by the happiness degree calculation unit 204 has been specifically described above. The degree of happiness calculated as described above is presented to the user in corresponding predetermined display methods according to the display control units 105 and 502. Also, the method of calculating the degree of happiness is not limited to the above-described example, and the number of terminals constituting the group may be further taken into consideration. Specifically, for example, in a case where the group information stored in the terminal information storage unit 202 includes the number of terminals constituting each group, the happiness degree calculation unit 204 can calculate a degree of happiness on the basis of the number of group terminals (that is, the number of groups), the number of terminals of a group, and the happiness coefficient.

2-1-7. Happiness Degree Display Example

Next, an example in which the degree of happiness is displayed by the display control unit 105 and 502 with the configurations described above will be specifically described with reference to FIGS. 18 to 23.

Figure 18:
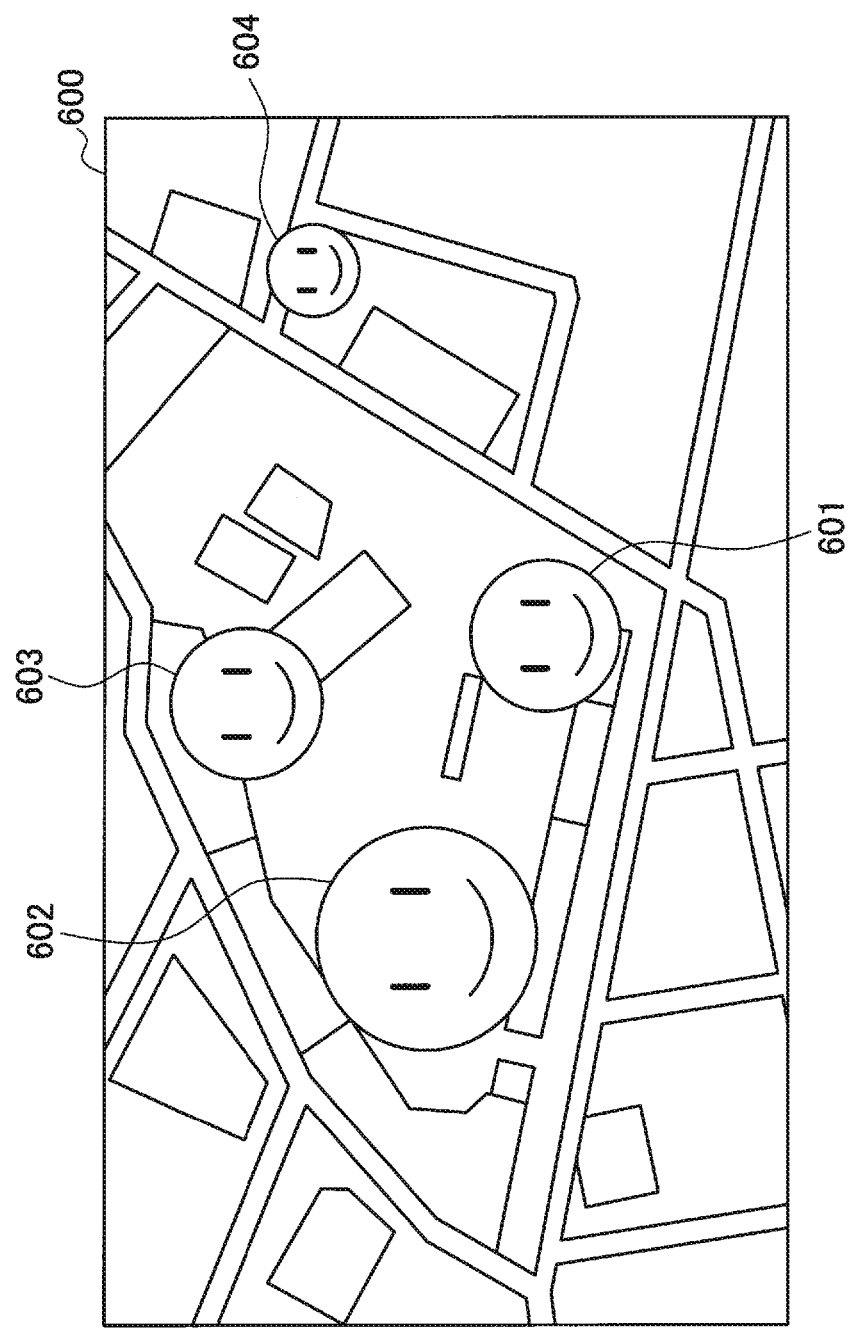
FIG. 18 is a diagram illustrating an example of a display screen on which a degree of happiness is displayed according to the first embodiment.

FIG. 18 is a diagram illustrating an example of a display screen on which the degree of happiness is displayed according to the first embodiment. In the illustrated example, a map image and smiling face icons 601 to 604 having sizes corresponding to levels of the degree of happiness are displayed on the display screen 600. A display position on the map image of the smiling face icons 601 to 604 indicating the degree of happiness corresponds to the installation position of the detection device 400 (or the information processing devices 100-1, 100-2, and 100-3 having a detection function). The installation position is pre-registered in the system as detailed information about the detection device. Although levels of degrees of happiness are indicated by the sizes of the smiling face icons 601 to 604 in the example illustrated in FIG. 18, the present embodiment is not limited thereto. For example, a level of the degree of happiness may be represented by an expression of the smiling face icon or a color intensity of the smiling face icon. Also, on the display screen 600, a degree of happiness for each place for a current date and time may be displayed in real time, a degree of happiness in an observation time period such as several days to several months may be displayed, a degree of happiness for a date and time designated by the user may be displayed, or an average degree of happiness for each day of the week or each of time periods may be displayed.

Figure 19:
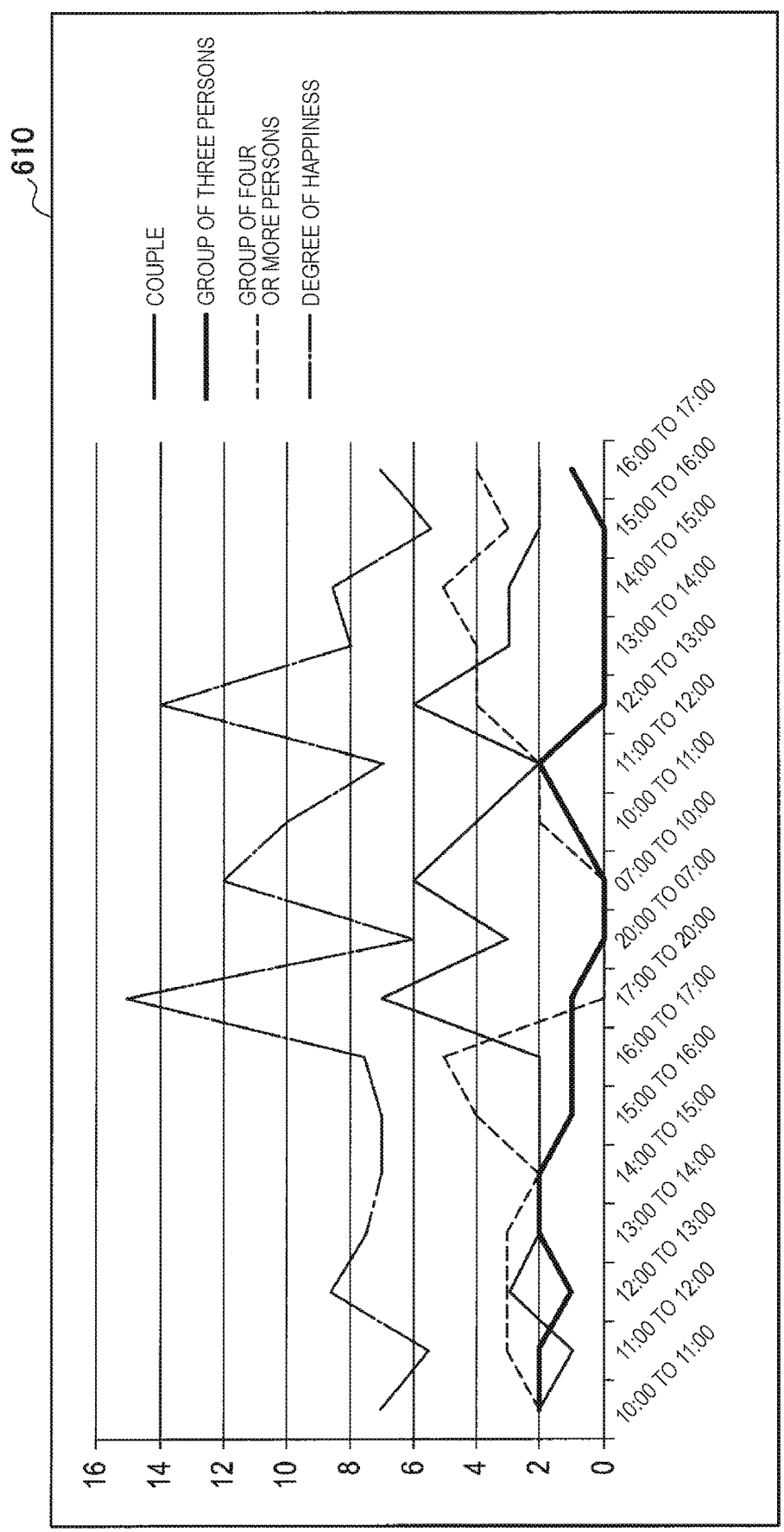
FIG. 19 is a diagram illustrating an example of a display screen on which a degree of happiness is displayed according to the first embodiment.

Also, the degree of happiness according to the present embodiment may be displayed as a graph, for example, as illustrated in FIG. 19. FIG. 19 is a diagram illustrating an example of a display screen on which the degree of happiness is displayed according to the first embodiment. In the illustrated example, the degree of happiness calculated for each unit time is graphically displayed on the display screen 610. In this case, it is possible to intuitively recognize how long a type of group is located in a certain place for each time and a degree of happiness for each time.

Figure 20:
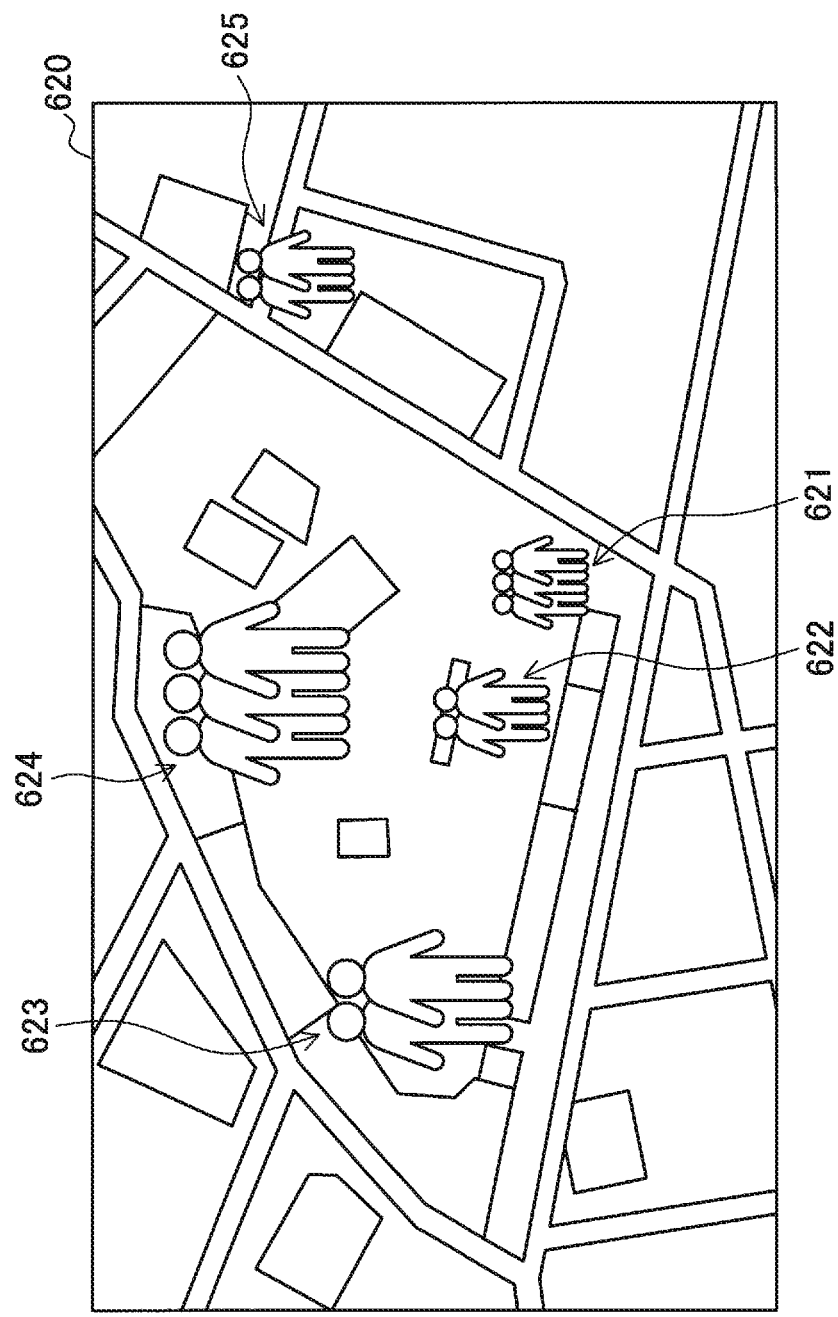
FIG. 20 is a diagram illustrating an example of a display screen on which group information is displayed according to the first embodiment.
Figure 21:
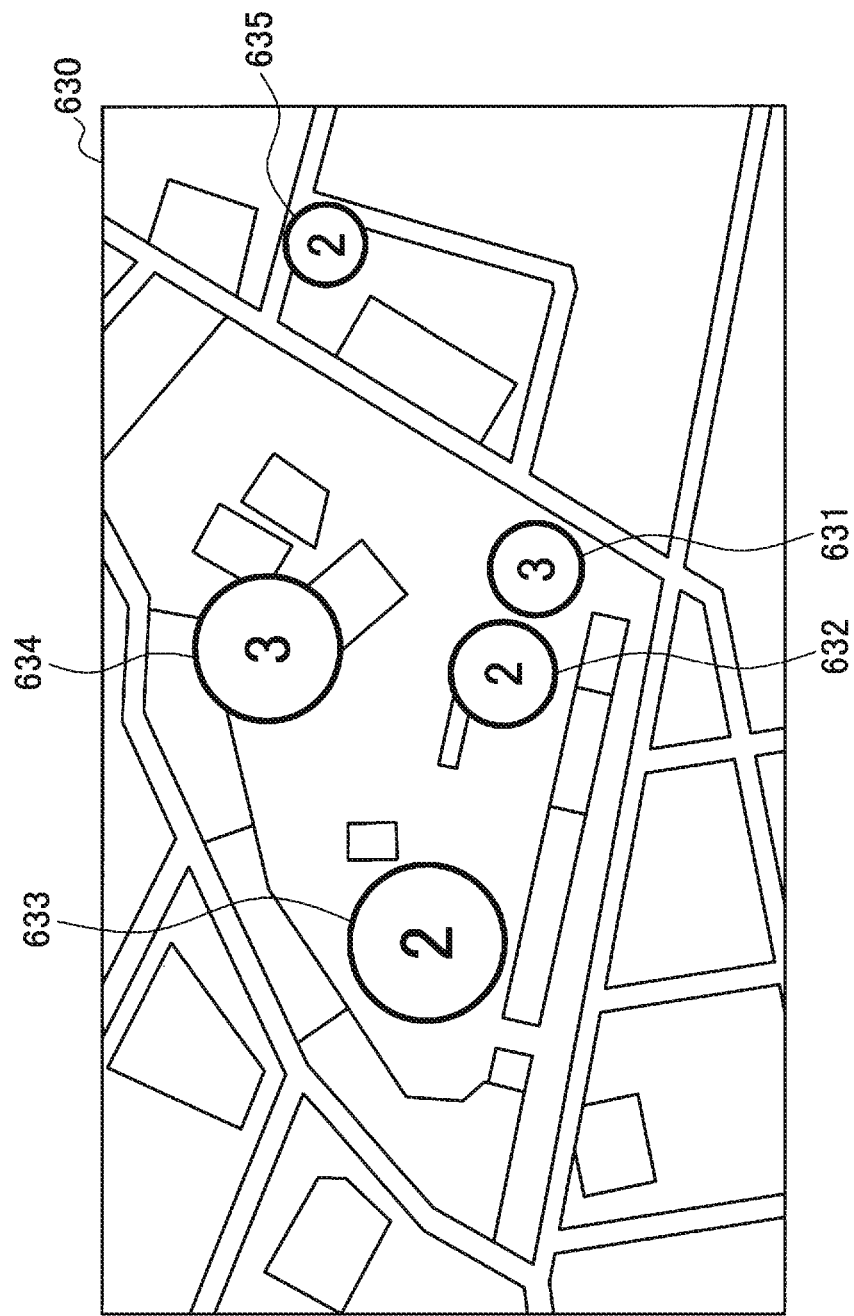
FIG. 21 is a diagram illustrating an example of a display screen on which group information is displayed according to the first embodiment.

Also, in the present embodiment, in addition to the degree of happiness, for example, group information may be displayed as illustrated in FIG. 20 and FIG. 21. FIG. 20 and FIG. 21 are diagrams illustrating an example of a display screen on which group information is displayed according to the first embodiment. In the example of FIG. 20, a map image and icons 621 to 625, each having a size corresponding to the number of groups and indicating the number of terminals constituting the group, are displayed on the display screen 620. For example, the icons 622, 623, and 625 indicate the presence of couple terminals including two terminals, and the icons 621 and 624 indicate the presence of group terminals including three terminals. In the example of FIG. 21, a map image and icons 631 to 635, each having a size according to the number of groups and numerically indicating the number of terminals constituting a group, are displayed on the display screen 630. For example, the icons 632, 633, and 635 indicate the presence of couple terminals including two terminals and the icons 631 and 634 indicate the presence of group terminals including three terminals.

Figure 22:
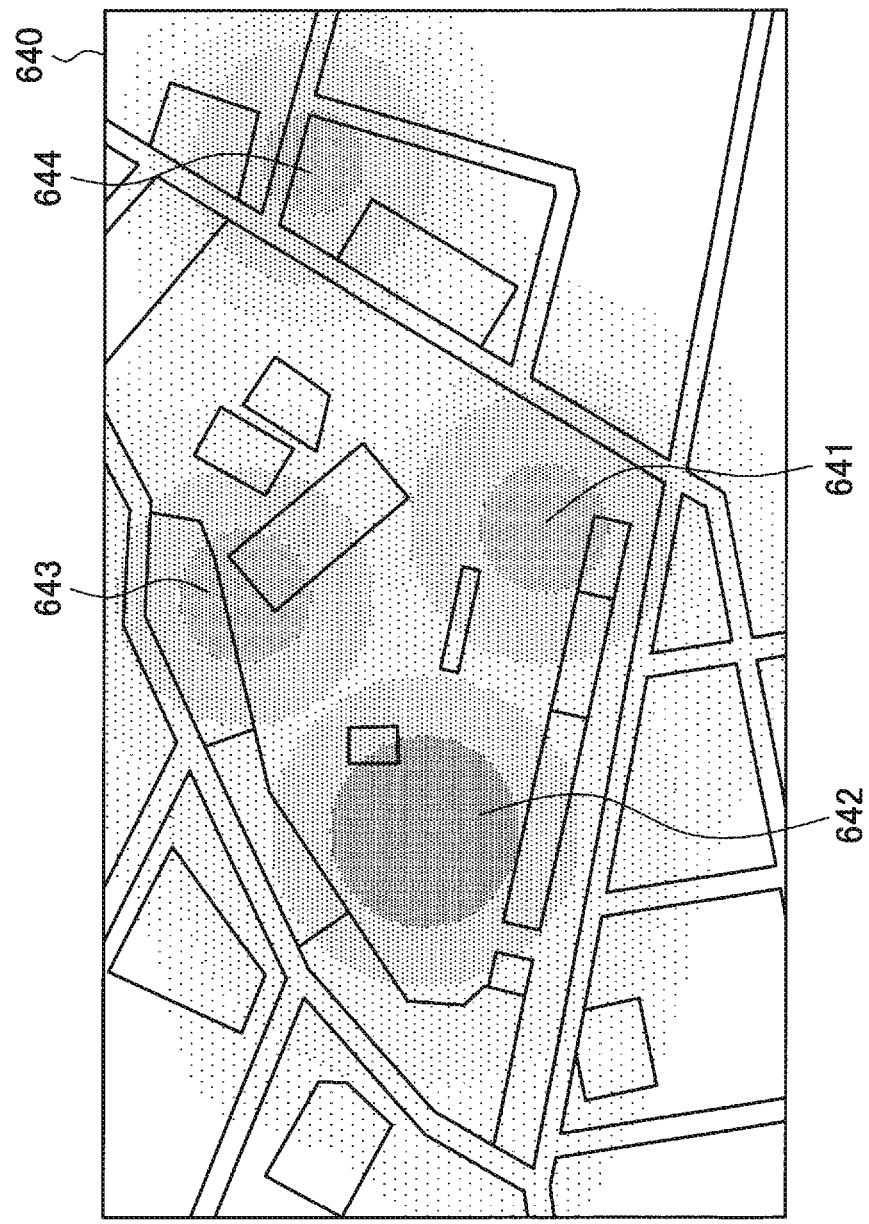
FIG. 22 is a diagram illustrating an example of a display screen on which a degree of happiness is displayed according to the first embodiment.

Also, FIG. 22 is a diagram illustrating an example of a display screen on which the degree of happiness is displayed according to the first embodiment. In the illustrated example, a map image and a heat map illustrating the degree of happiness are displayed on the display screen 640. Because the degree of happiness at a point 642 is higher than the degrees of happiness at other points 641, 643, and 644 in the example of FIG. 22, the degree of happiness at the point 642 is represented in a dark color.

Figure 23:
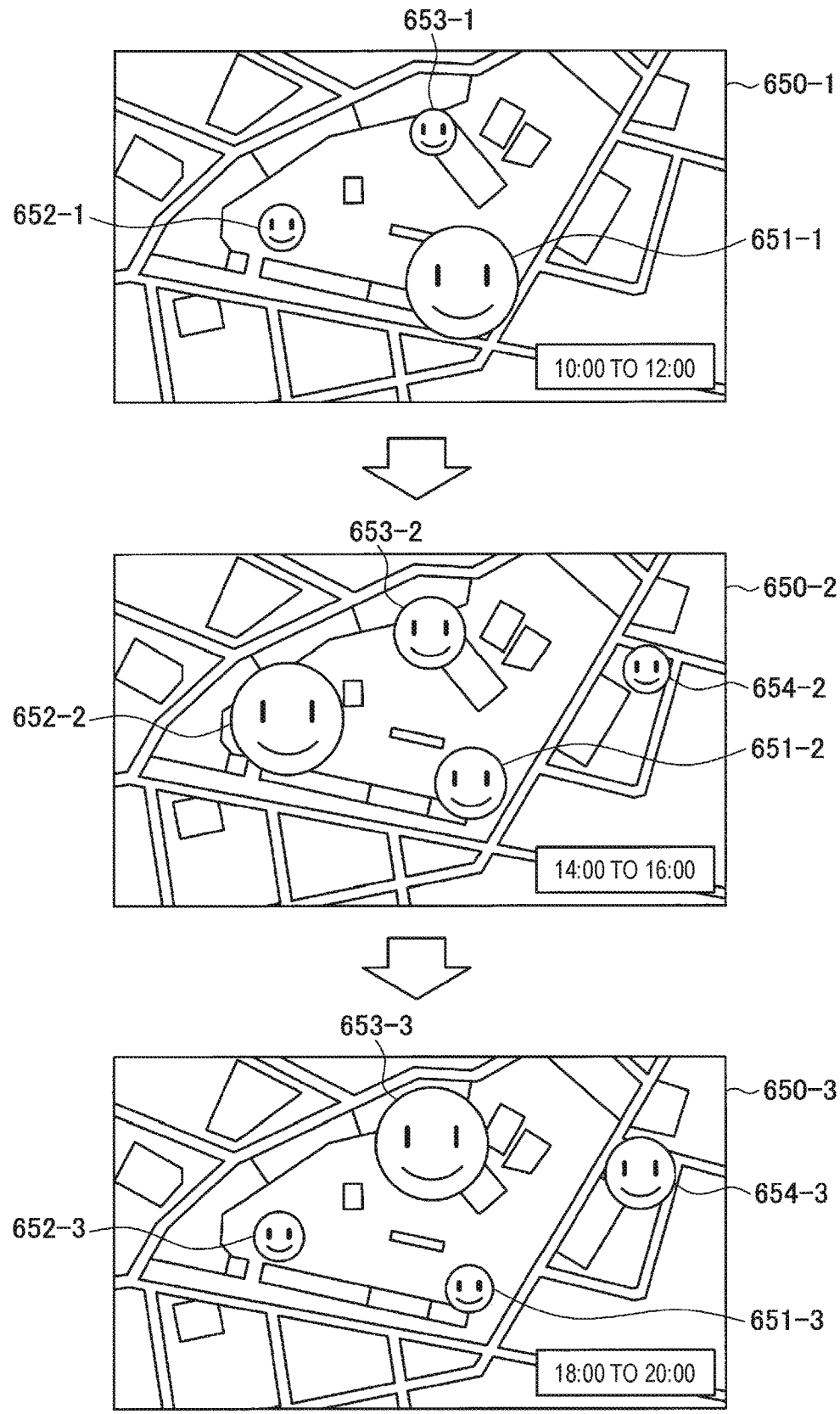
FIG. 23 is a diagram illustrating an example of a display screen on which a degree of happiness is displayed according to the first embodiment.

Also, FIG. 23 is a diagram illustrating an example of a display screen on which the degree of happiness is displayed according to the first embodiment. In the illustrated example, flows of the degree of happiness for each elapsed time are displayed on display screens 650-1, 650-2, and 650-3. That is, for example, smiling face icons 651-1, 652-1, and 653-1 indicating degrees of happiness in places from 10:00 to 12:00 are displayed on the display screen 650-1 and smiling face icons 651-2, 652-2, 653-2, and 654-2 indicating degrees of happiness in places from 14:00 to 16:00 are displayed on the next display screen 650-2. Subsequently, smiling face icons 651-3, 652-3, 653-3, and 654-3 indicating degrees of happiness in places from 18:00 to 20:00 are displayed on the display screen 650-3. It is possible to intuitively ascertain the transition of the degree of happiness in each place by sequentially displaying such display screens 650-1, 650-2, and 650-3. Because the smiling face icons 650 displayed on these display screens are displayed in sizes corresponding to the levels of the degrees of happiness, it can be seen that a degree of happiness is higher in a place where a larger smiling face icon 650 is displayed.

The happiness degree calculation system according to the first embodiment of the present disclosure has been described above. According to the first embodiment, it is possible to easily detect the degree of happiness in a place by detecting surrounding information processing terminals and extracting terminals which are likely to be located together as group terminals (for example, a determination using the co-occurrence rate as an example). Also, by calculating the degree of happiness of a place and presenting the degree of happiness to the user, for example, it is possible to arrange products which are likely to be bought by people with a high degree of happiness in storefronts in stores around the place and to expect improvement in sales. Also, an improvement in advertisement effects can be expected by displaying an event guide and product promotions for people with a high degree of happiness in a digital sign installed in a place with a high degree of happiness. Also, details of products and events for people with a high degree of happiness can be determined from stored product purchasing behavior and event participation behavior in a place with a high degree of happiness.

2-2. Second Embodiment

Subsequently, a happiness degree calculation system according to a second embodiment of the present disclosure will be described. In the present embodiment, it is possible to improve the accuracy of group terminal extraction by excluding terminals that are constantly located together instead of being in a group action in a group terminal extraction process.

For example, the group terminal extraction unit 203 (see FIGS. 7 and 9) may exclude couple terminals having a very high co-occurrence rate when group terminals are separated from couple terminal candidates (see FIG. 14). In other words, considering that two smartphones may currently be possessed and the number of wearable terminals possessed will also increase in the future, it is not rare for a single person to possess a plurality of information processing terminals. Therefore, it is possible to improve the accuracy of group terminal extraction, for example, by excluding couple terminals or group terminals including three or more terminals having a co-occurrence rate of approximately 1.0 other than one representative terminal.

Also, the group terminal extraction unit 203 may exclude an information processing terminal detected by a specific terminal detection unit 101. That is, for example, because a plurality of information processing terminals simultaneously detected by a terminal detection unit 101 installed in a gate through which only one person can pass or a toilet that only one person can enter are likely to be information processing terminals held by a single person, information processing terminals thereof other than one representative terminal are excluded.

Also, the group terminal extraction unit 203 may exclude fixed terminals. For example, the group terminal extraction unit 203 can exclude the fixed terminals installed in a surrounding area by excluding terminals frequently and continuously detected by the terminal detection unit 101.

Figure 24:
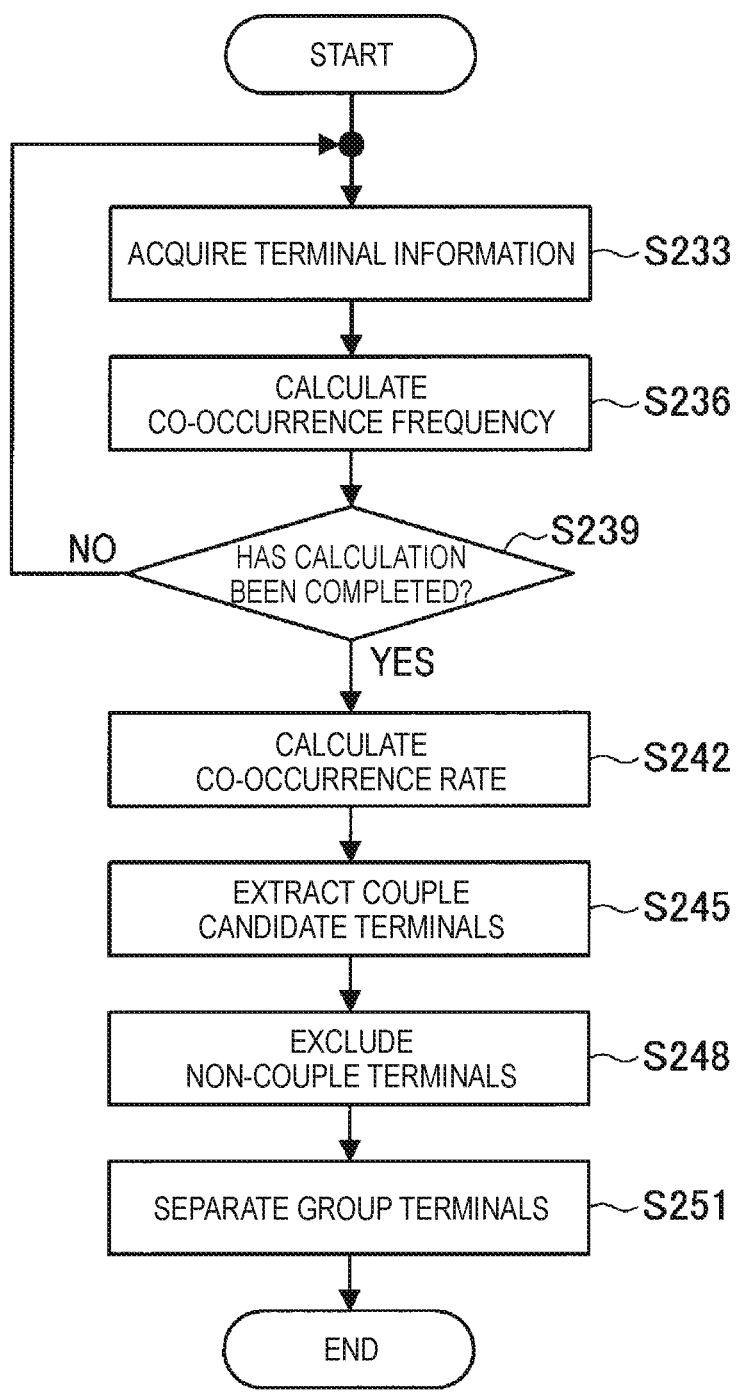
FIG. 24 is a flowchart illustrating a group terminal extraction process according to a second embodiment.

The group terminal extraction process including such a terminal exclusion process will be described with reference to FIG. 24. FIG. 24 is a flowchart illustrating the group terminal extraction process according to the second embodiment.

As illustrated in FIG. 24, the group terminal extraction unit 203 first acquires terminal information in an extraction target period from the terminal information storage unit (S233) and calculates a co-occurrence frequency of each terminal (S236).

Next, when calculation of all co-occurrence frequencies of the information processing terminals detected in the same time period in the extraction target period is completed (S239/Yes), the group terminal extraction unit 203 calculates the co-occurrence rate of each terminal (S242).

Next, the group terminal extraction unit 203 extracts couple terminal candidates on the basis of the calculated co-occurrence rates (S245).

Next, the group terminal extraction unit 203 excludes non-couple terminals from the couple terminal candidates (S248). As described above, a non-couple terminal is a fixed terminal or a terminal other than one representative terminal among couple terminals/group terminals (in a narrow sense) having an extremely high co-occurrence rate (of almost 1.0) or couple terminals/group terminals (in a narrow sense) detected by a specific terminal detection unit 101.

Then, the group terminal extraction unit 203 separates group terminals (in a broad sense) including a couple terminal from the remaining couple terminal candidates other than the non-couple terminals (S251).

2-3. Third Embodiment

Next, a happiness degree calculation system according to a third embodiment of the present disclosure will be described. In the present embodiment, it is possible to improve the accuracy of calculation of the degree of happiness by adjusting the degree of happiness in consideration of a situation around the terminal detection unit 101 in the happiness degree calculation process. The surrounding situations include, for example, a place category (an example of attribute information) such as an office area or an amusement park, a time category such as a weekday daytime, a nighttime, or a holiday, a discomfort index based on temperature and humidity (an example of a surrounding environment), or the like. That is, for example, in a case where a couple terminal or group terminal (in a narrow sense) is extracted, there is a possibility that couple terminals during the daytime in an office area are likely to be detected while two persons are working in a pair and there is not necessarily a high degree of happiness in such a situation.

The configuration of the happiness degree calculation system according to the third embodiment may be entirely implemented by the integrated information processing device 100 as in the first embodiment or may be of a cloud type in which a part of processing is performed on the cloud (the server 200 side). Also, the terminal detection unit that detects an information processing terminal, the happiness degree calculation unit, and the display unit that displays a degree of happiness may operate as separate devices (for example, the detection device 410, the server 200, and the display device 500). Hereinafter, a happiness degree calculation method in consideration of a recognized situation will be specifically described after the description of the configuration example of the happiness degree calculation system and the operation processing thereof according to the third embodiment (Embodiments 3A to 3C).

2-3-1. Embodiment 3A (Configuration)

Figure 25:
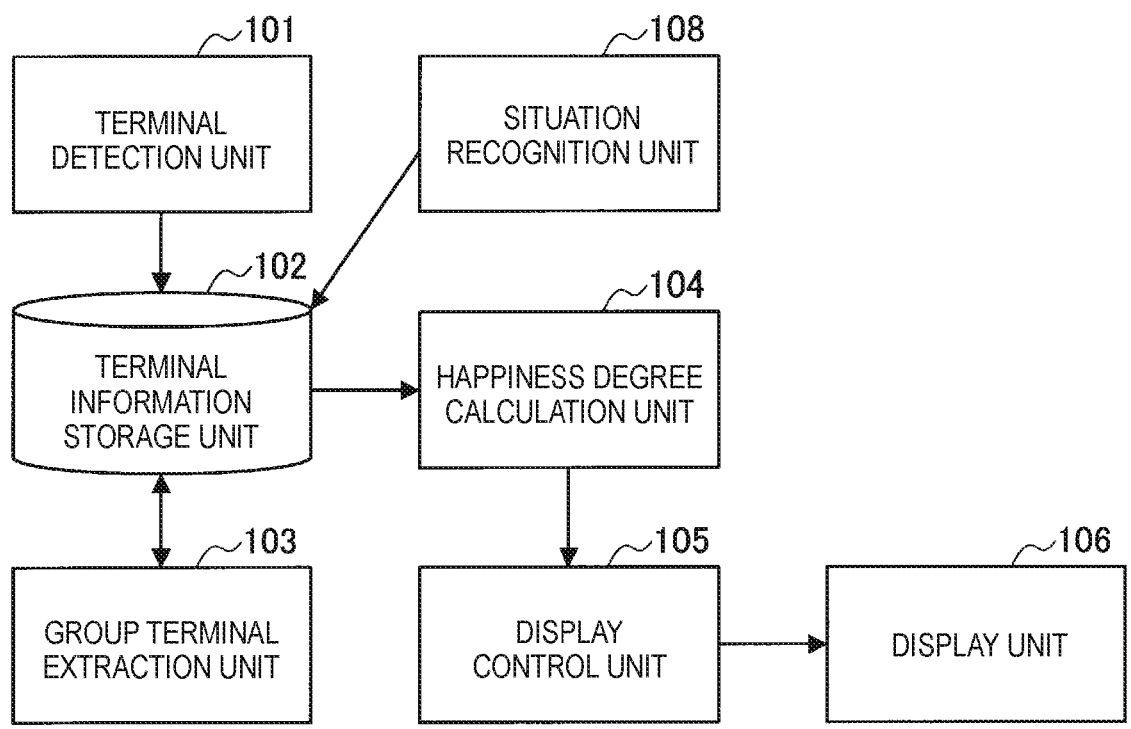
FIG. 25 is a diagram illustrating a functional configuration example of an information processing device according to Embodiment 3A.

FIG. 25 is a diagram illustrating a functional configuration example of the information processing device 100-4 according to Embodiment 3A. The information processing device 100-4 can be implemented by, for example, a portable terminal device or a stationary terminal device such as a digital sign.

As illustrated in FIG. 25, the information processing device 100-4 includes a terminal detection unit 101, a terminal information storage unit 102, a group terminal extraction unit 103, a happiness degree calculation unit 104, a display control unit 105, a display unit 106, and a situation recognition unit 108.

The situation recognition unit 108 has a function of recognizing the situation around the information processing device 100-4. For example, the situation recognition unit 108 acquires place information on the basis of position information (for example, latitude/longitude) of the information processing device 100-4. The place information may be acquired from a place information storage unit (not illustrated) pre-stored in the information processing device 100-3, or may be acquired from a place information database (not illustrated) on a cloud in a case where the network communication unit is provided. Also, in a case where the information processing device 100-4 does not move, the place information may be recorded as a fixed value. The place information is a place category such as an office area or an amusement park. Also, the situation recognition unit 108 may acquire the time category based on the current date and time and the discomfort index capable of being calculated from the ambient temperature or humidity without being limited to the acquisition of the place information as the recognition of the surrounding situation. Both are used for determining the happiness coefficient when the degree of happiness is calculated.

The recognition result of the situation recognition unit 108 is stored in the terminal information storage unit 202 together with the terminal information and the group information.

The happiness degree calculation unit 104 acquires the surrounding situation (for example, place information) recognized by the situation recognition unit 108 and the group information generated by the group terminal extraction unit 103 from the terminal information storage unit 202 and calculates a degree of happiness in consideration of a surrounding situation. The method of calculating the degree of happiness according to the present embodiment will be described below with reference to FIGS. 31 and 32.

(Operation Processing)

Figure 26:
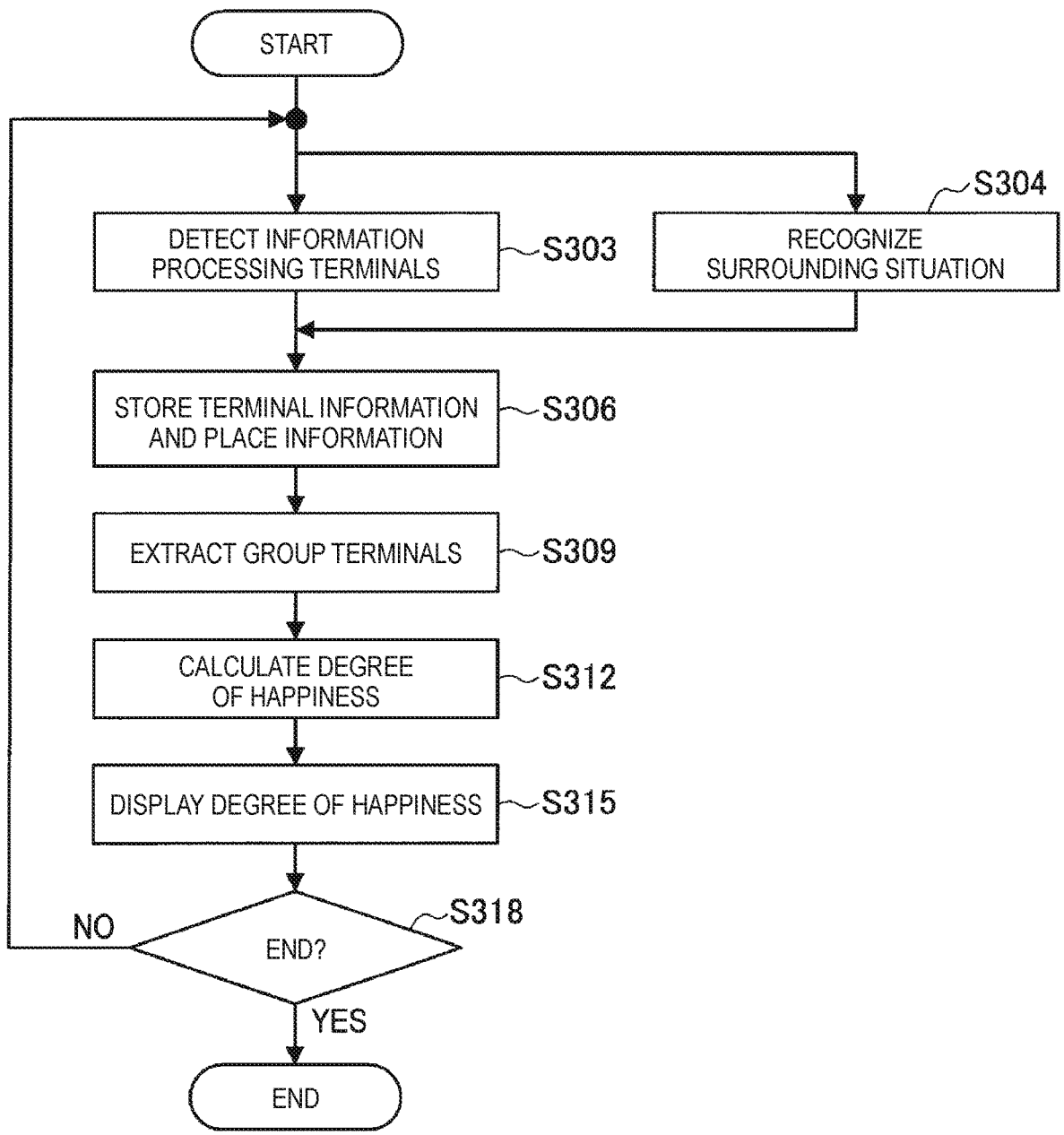
FIG. 26 is a flowchart illustrating a happiness degree display process according to Embodiment 3A.

FIG. 26 is a flowchart illustrating a happiness degree display process according to Embodiment 3A. As illustrated in FIG. 26, the terminal detection unit 101 of the information processing device 100-4 first detects an information processing terminal located in a surrounding area (S303).

Next, the situation recognition unit 108 recognizes the surrounding situation (S304). The processing of S303 and S304 may be performed one after another or may be performed at the same time.

Next, the information processing device 100-4 stores the terminal information acquired from the information processing terminals detected by the terminal detection unit 101 and a result of recognizing a surrounding situation (here, for example, place information) in the situation recognition unit 108 in the terminal information storage unit 102 (S306).

Next, the group terminal extraction unit 103 extracts group terminals on the basis of the terminal information stored in the terminal information storage unit 102 and generates group information (S309).

Next, the happiness degree calculation unit 104 calculates the degree of happiness on the basis of the group information generated by the group terminal extraction unit 103 and the place information (S312).

Subsequently, the display control unit 105 causes the display unit 106 to display the degree of happiness calculated by the happiness degree calculation unit 104 (S315).

Then, the above-described processing of S303 to S315 is iterated until termination of the degree of happiness display process in the information processing device 100-4 is indicated (S318).

(Effects)

As described above, the information processing device 100-4 implemented by the digital sign or the like calculates the degree of happiness in consideration of a situation around a place where the information processing device 100-4 is installed, so that the accuracy of the happiness degree calculation can be improved.

2-3a-2. Embodiment 3B

Next, Embodiment 3B according to the present disclosure will be described. Although the information processing device 100-4 calculates the degree of happiness in Embodiment 3A described above, the configuration of the third embodiment is not limited thereto. For example, the calculation of the degree of happiness may be performed using a cloud on the server side. Hereinafter, a happiness degree calculation system for calculating the degree of happiness on the server side will be described with reference to FIGS. 27 and 28.

(Configuration)

Figure 27:
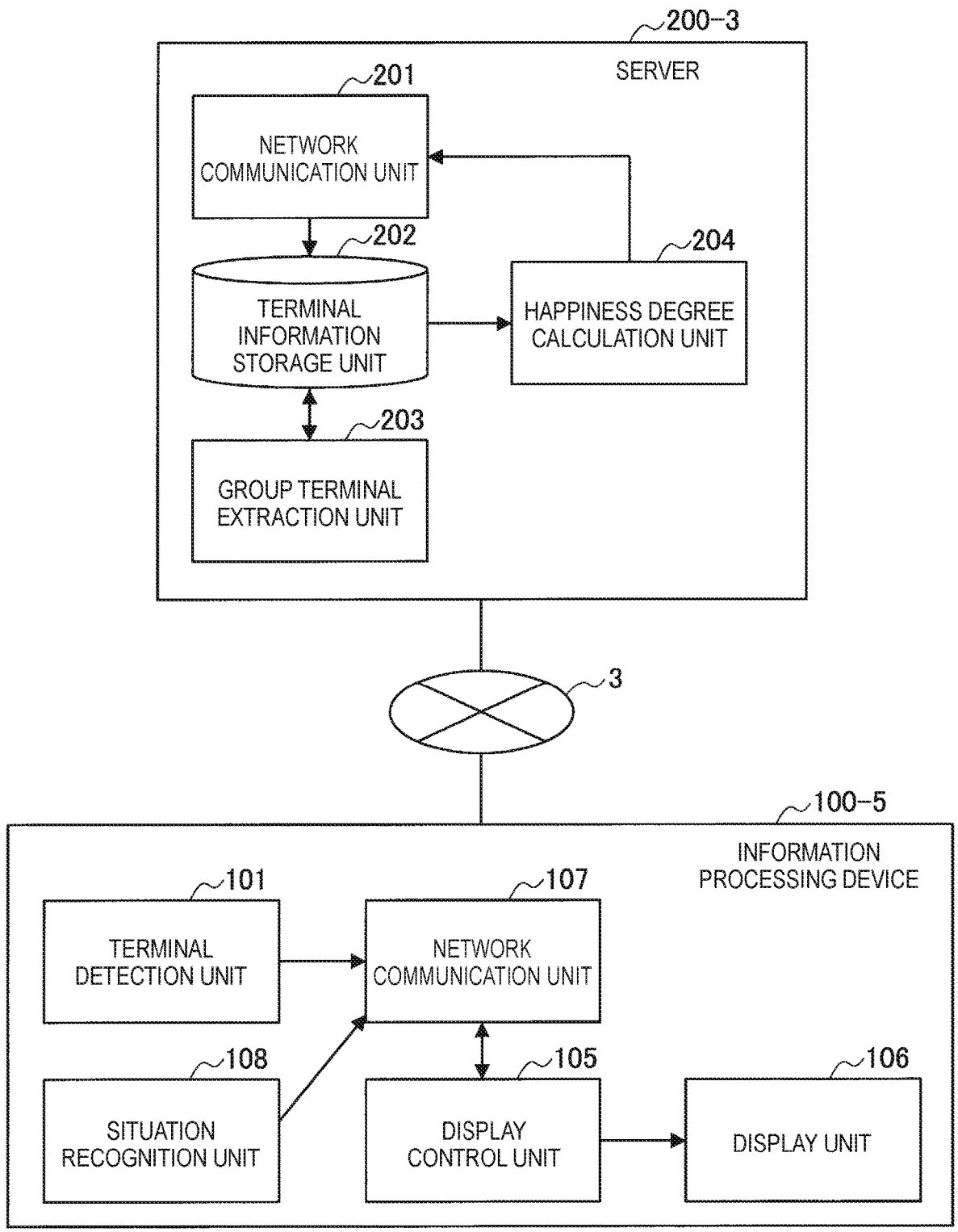
FIG. 27 is a diagram illustrating a functional configuration example of an information processing device according to Embodiment 3B.

FIG. 27 is a diagram illustrating a functional configuration of a happiness degree calculation system according to the present embodiment. As illustrated in FIG. 27, the happiness degree calculation system according to the present embodiment includes an information processing device 100-5 and a server 200-3, and the devices are connected via a network 3. The information processing device 100-5 is implemented by, for example, a digital sign.

The information processing device 100-5 includes a terminal detection unit 101, a situation recognition unit 108, a network communication unit 107, a display control unit 105, and a display unit 106. The network communication unit 107 transmits terminal information of information processing terminals detected by the terminal detection unit 101 and a result of recognizing a surrounding situation in the situation recognition unit 108 for each time stamp to the server 200-3 along with the detection device ID of the information processing device 100-5. The display control unit 105 performs control so that the display unit 106 displays the degree of happiness calculated by the server 200-3 received by the network communication unit 107.

The server 200-3 includes a network communication unit 201, a terminal information storage unit 202, a group terminal extraction unit 203, and a happiness degree calculation unit 204. The terminal information storage unit 202 stores terminal information (specifically, terminal information linked with the time stamp and the detection device ID) transmitted from the information processing device 100-5 and received by the network communication unit 201 and a recognition result of a surrounding situation. Also, group information generated by the group terminal extraction unit 203 is also stored in the terminal information storage unit 202.

The happiness degree calculation unit 204 calculates the degree of happiness of the place around the information processing device 100-5 on the basis of the group information stored in the terminal information storage unit 202 and the result of recognizing the surrounding situation. The calculated degree of happiness is returned to the information processing device 100-5 through the network communication unit 201.

(Operation Processing)

Figure 28:
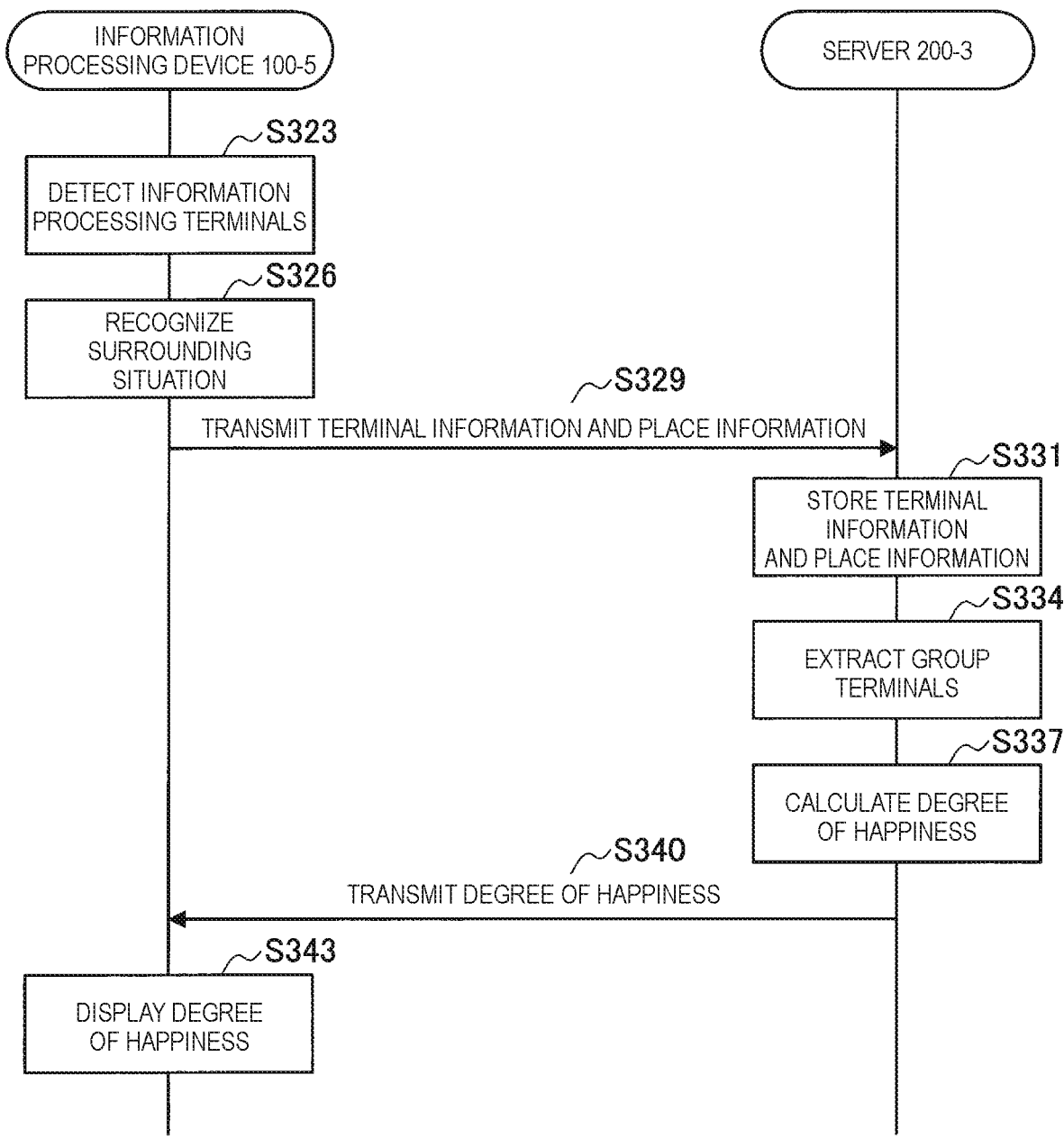
FIG. 28 is a flowchart illustrating a happiness degree display process according to Embodiment 3B.

FIG. 28 is a flowchart illustrating the happiness degree display process according to the present embodiment. As illustrated in FIG. 28, the terminal detection unit 101 of the information processing device 100-5 first detects surrounding information processing terminals and acquires terminal information from the detected information processing terminals (S323).

Next, the situation recognition unit 108 recognizes a surrounding situation (S326). Here, the situation recognition unit 108 acquires a place situation as an example.

Subsequently, the network communication unit 107 transmits the terminal information acquired by the terminal detection unit 101 and the place information acquired by the situation recognition unit 108 to the server 200-3 via the network 3 (S329).

Next, the server 200-3 stores the terminal information and the place information transmitted from the information processing device 100-5 in the terminal information storage unit 202 (S331).

Next, the server 200-3 extracts group terminals from the stored terminal information using the group terminal extraction unit 203 (S334). The group information about the group terminals extracted by the group terminal extraction unit 203 is stored in the terminal information storage unit 202.

Next, the happiness degree calculation unit 204 calculates the degree of happiness around the information processing device 100-5 on the basis of the group information and the place information (S337).

Next, the network communication unit 201 transmits the calculated degree of happiness to the information processing device 100-5 (S340).

Then, the display control unit 105 of the information processing device 100-5 causes the display unit 106 to display the degree of happiness transmitted from the server 200-3 (S343).

(Effects)

As described above, in Embodiment 1B, processing such as group terminal extraction and calculation of degrees of happiness can be performed on a cloud. At this time, the server 200-3 on the cloud can more accurately calculate the degree of happiness by calculating the degree of happiness in consideration of a result of recognizing a situation around the information processing device 100-4.

2-3-3. Embodiment 3C

Subsequently, a third embodiment according to the present disclosure will be described. In the present embodiment, by using a cloud, a group terminal extraction function and a happiness degree calculation function are performed on a server 200 side, and a terminal detection function and a happiness degree display function are implemented separately. The number of detection devices 410 having the terminal detection function may be one or more. This will be specifically described with reference to FIGS. 29 and 30.

(Configuration)

Figure 29:
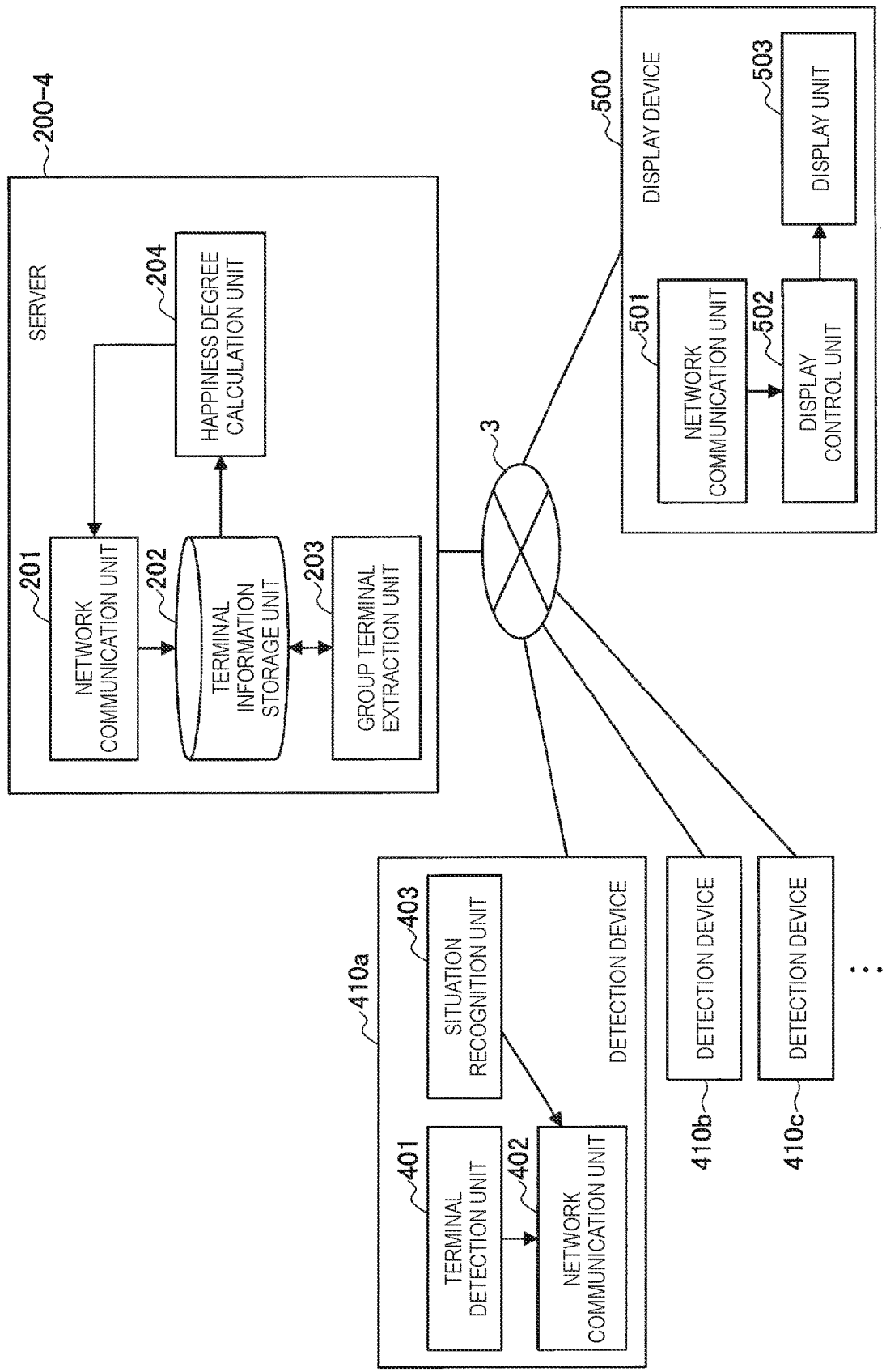
FIG. 29 is a diagram illustrating a functional configuration example of an information processing device according to Embodiment 3C.

FIG. 29 is a diagram illustrating a functional configuration example of the happiness degree calculation system according to the present embodiment. As illustrated in FIG. 29, the happiness degree calculation system according to the present embodiment includes a detection device 410 (410a, 410b, 410c, . . . ), a server 200-4, and a display device 500, and the devices are connected via a network 3. The display device 500 is implemented by, for example, a digital sign, a portable terminal, or the like.

The detection device 410 is a monitoring node including a terminal detection unit 401, a situation recognition unit 403, and a network communication unit 402. The network communication unit 402 transmits terminal information about information processing terminals detected by the terminal detection unit 401 and a result of recognizing a situation in the situation recognition unit 403 to the server 200-4 together with a detection device ID of the detection device 410 for each time stamp. In a case where the detection device 410 is a stationary device that does not move, the network communication unit 402 may separately transmit a fixed value of the place information to the server 200-4 together with the detection device ID of the detection device 410. Also, as illustrated in FIG. 29, the number of detection devices 410 may be two or more. In this case, the plurality of detection devices 410a, 410b, and 410c are arranged within a fixed range (for example, an event site, a theme park, a station premises, or the like) which is the observation object of the degree of happiness.

The server 200-4 includes a network communication unit 201, a terminal information storage unit 203, a group terminal extraction unit 203, and a happiness degree calculation unit 204. The terminal information storage unit 202 stores the terminal information (specifically, the terminal information linked with the time stamp and the detection device ID) transmitted from the detection device 410 and received by the network communication unit 201. Also, the terminal information storage unit 202 stores the situation recognition result transmitted from the detection device 410 and received by the network communication unit 201. Furthermore, the group information generated by the group terminal extraction unit 203 is stored in the terminal information storage unit 202. The happiness degree calculation unit 204 calculates a degree of happiness of a place around the detection device 410 on the basis of the group information stored in the terminal information storage unit 202 and a result of recognizing the surrounding situation. The calculated degree of happiness is transmitted to the display device 500 through the network communication unit 201.

The display device 500 includes a network communication unit 501, a display control unit 502, and a display unit 503. The display control unit 502 performs control so that the display unit 503 displays the degree of happiness calculated by the server 200-4 received by the network communication unit 501.

(Operation Processing)

Figure 30:
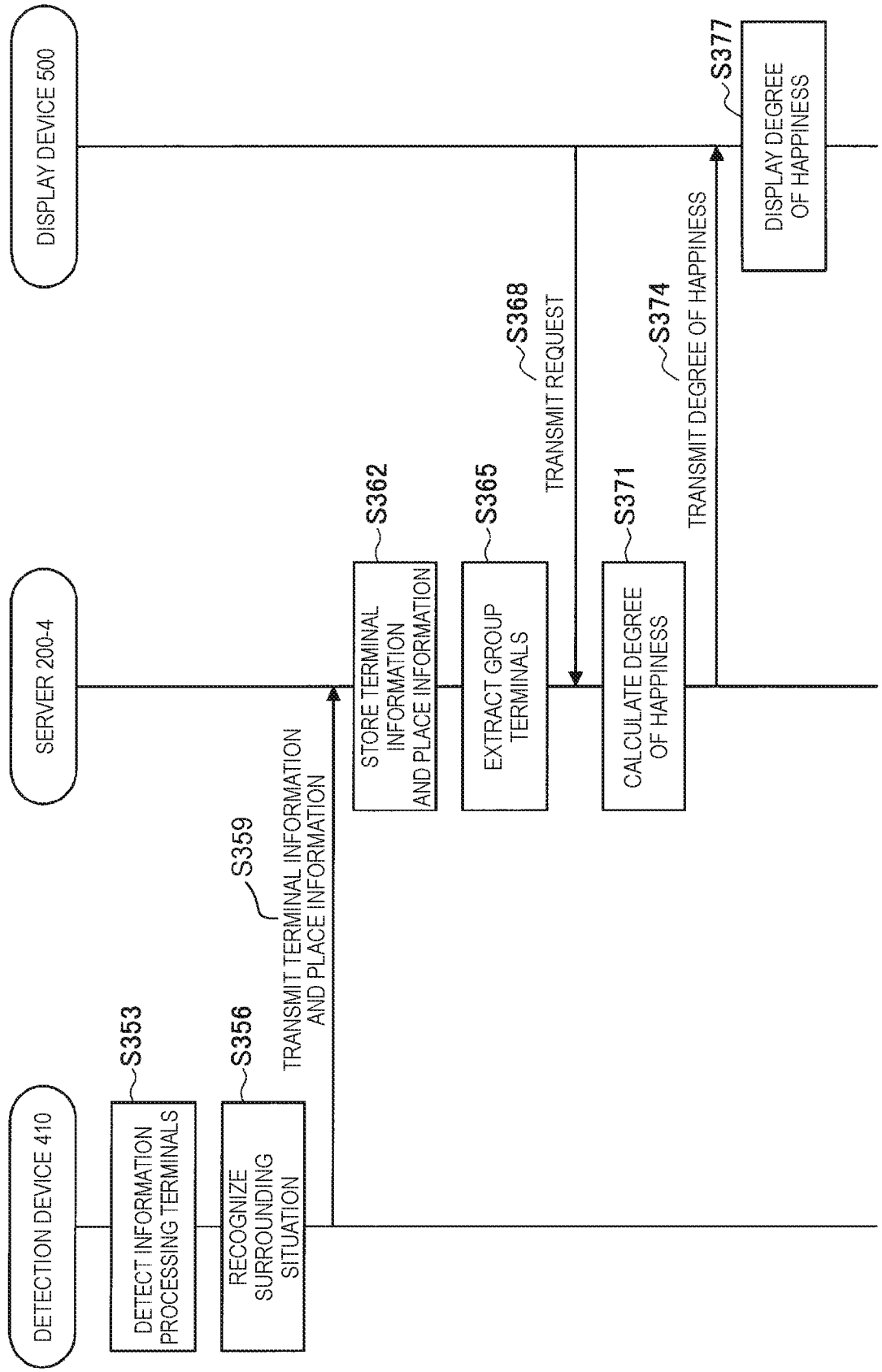
FIG. 30 is a flowchart illustrating a happiness degree display process according to Embodiment 3C.

FIG. 30 is a flowchart illustrating a happiness degree display process according to the present embodiment. As illustrated in FIG. 30, the terminal detection unit 401 of the detection device 410 first detects surrounding information processing terminals and acquires terminal information from the detected information processing terminals (S353).

Next, the situation recognition unit 403 recognizes a surrounding situation (S356). Here, the situation recognition unit 108 acquires a place situation as an example.

Subsequently, the network communication unit 402 transmits the terminal information acquired by the terminal detection unit 401 and the place information acquired by the situation recognition unit 403 to the server 200-4 via the network 3 (S359).

Next, the server 200-4 stores the terminal information and the place information transmitted from the detection device 410 in the terminal information storage unit 202 (S362).

Next, the server 200-4 extracts group terminals from the stored terminal information using the group terminal extraction unit 203 (S365). Group information about the group terminals extracted by the group terminal extraction unit 203 is stored in the terminal information storage unit 202.

Next, when a happiness degree transmission request is transmitted from the display device 500 (S368), the server 200-4 calculates a degree of happiness of a place around the detection device 410 (or within a certain range in which the plurality of detection devices 410a, 410b, and 410c are arranged) using the happiness degree calculation unit 204 (S371). At this time, the happiness degree calculation unit 204 calculates the degree of happiness in consideration of information about a place around the detection device 410.

Subsequently, the network communication unit 201 of the server 200-4 transmits the degree of happiness to the display device 500 (S374).

Then, the display control unit 502 of the display device 500 causes the display unit 503 to display the degree of happiness transmitted from the server 200-2 (S204). Specifically, the display control unit 502 performs control so that the degree of happiness around the place where the detection device 410 is arranged is displayed. In a case where the detection device 400 is arranged around the display device 500, the display control unit 502 may display the degree of happiness transmitted from the server 200-4 as the degree of happiness around its own device. Also, in a case where the display device 500 also receives a degree of happiness in another place from the server 200-4, the degree of happiness of the other place can also be displayed together with, for example, a map image.

(Effects)

As described above, in Embodiment 3C, processing such as group terminal extraction and calculation of degrees of happiness is performed on a cloud, and the detection function and the display function of the information processing terminal can be implemented separately. Also, the server 200-3 on the cloud can more accurately calculate the degree of happiness by calculating the degree of happiness in consideration of a result of recognizing a situation around the detection device 410.

2-3-4 Happiness Degree Calculation Process in Consideration of Recognition Situation The plurality of configuration examples and operation processing of the happiness degree calculation system according to the third embodiment have been specifically described above. Next, happiness degree calculation methods of the happiness degree calculation units 104 and 204 with the configurations described above will be specifically described with reference to FIGS. 31 and 32. Here, the happiness degree calculation method of the happiness degree calculation unit 204 of the server 200 will be described as a representative.

FIG. 31 is a diagram illustrating an example of place information for each detection device ID. In the illustrated example, for example, place information acquired on the basis of latitude/longitude of the information processing device 100-5 (or the detection device 410) recognized by the situation recognition unit 108 (or the situation recognition unit 403) is displayed. As the place information, as illustrated in FIG. 31, for example, place categories such as an office area, a residential area, and an amusement park are used. Although place information is illustrated in FIG. 31 as an example of the situation recognition result, the present embodiment is not limited thereto and the situation recognition result may be a time category or a discomfort index.

When a degree of happiness of a target place is calculated using the group information, the happiness degree calculation unit 204 calculates the degree of happiness in consideration of a result of recognizing a surrounding situation in the target place as illustrated in FIG. 31. Here, the happiness degree calculation unit 204 can calculate the degree of happiness on the basis of the extracted number of group terminals (i.e., the number of groups) and a happiness coefficient as in the first embodiment. The happiness coefficient used at this time corresponds to the result of recognizing the surrounding situation. An example of such a happiness coefficient is illustrated in FIG. 32.

FIG. 32 is a diagram illustrating an example of the happiness coefficient corrected according to a situation according to the third embodiment. In the illustrated example, happiness coefficients corresponding to the number of terminals of each group according to the place category and the time category are shown. For example, a happiness coefficient of, for example, two group terminals (couple terminals), is 2.0 for "06:00 to 18:00" if the target place is an "amusement park," 3.0 for "18:00 to 06:00" in an amusement park, 0.1 for "06:00 to 18:00 on a weekday" in an office area, and 2.0 in a time period "other than 06:00 to 18:00 on a weekday" in an office area.

Here, for example, the calculation of the degree of happiness h in consideration of the situation recognition result in a case where five couple terminal sets, three group terminal sets, each including three terminals, and one group terminal set including six terminals are extracted from the terminal information of the place where the degree of happiness is calculated will be described.

In a case where the target place is an "amusement park" and the target time is night (18:00 to 06:00), "3.0" is used for couple terminals, "1.5" is used for three group terminals, and "1.0" is used for four or more group terminals on the basis of the happiness coefficient illustrated in FIG. 32. Therefore, the degree of happiness h of the target place is calculated as 20.5 according to the following Formula 5.

[Math. 5]

$$h = 3.0 \times 5 + 1.5 \times 3 + 1.0 \times 1 \qquad \text{Formula 5}$$

On the other hand, in a case where the target place is an "office area" and the target time is a daytime (06:00 to 18:00) on a weekday, "0.1" is used for couple terminals, "0.1" is used for three group terminals, and "0.1" is used for four or more group terminals on the basis of the happiness coefficient illustrated in FIG. 32. Therefore, the degree of happiness h of the target place is calculated as 0.9 according to the following Formula 6.

[Math. 6]

$$h = 0.1 \times 5 + 0.1 \times 3 + 0.1 \times 1 \qquad \text{Formula 6}$$

(Effects)

As described above, in the third embodiment, it is possible to more accurately calculate the degree of happiness of a place using the happiness coefficient corrected according to the result of recognizing a situation around the detection device (terminal detection unit).

2-4. Fourth Embodiment

Next, a happiness degree calculation system according to a fourth embodiment of the present disclosure will be described. In the present embodiment, a group terminal (that is, group behavior) in a place where the happiness degree is calculated is extracted on the basis of the stored terminal information. On the other hand, it is possible to further improve the accuracy of the happiness degree calculation by extracting a single-person terminal (a single terminal) which is for the most part operated by one person and referring to information about the single-person terminal when the degree of happiness is calculated. Hereinafter, this will be specifically described with reference to FIGS. 33 to 36.

(Configuration)

Figure 33:
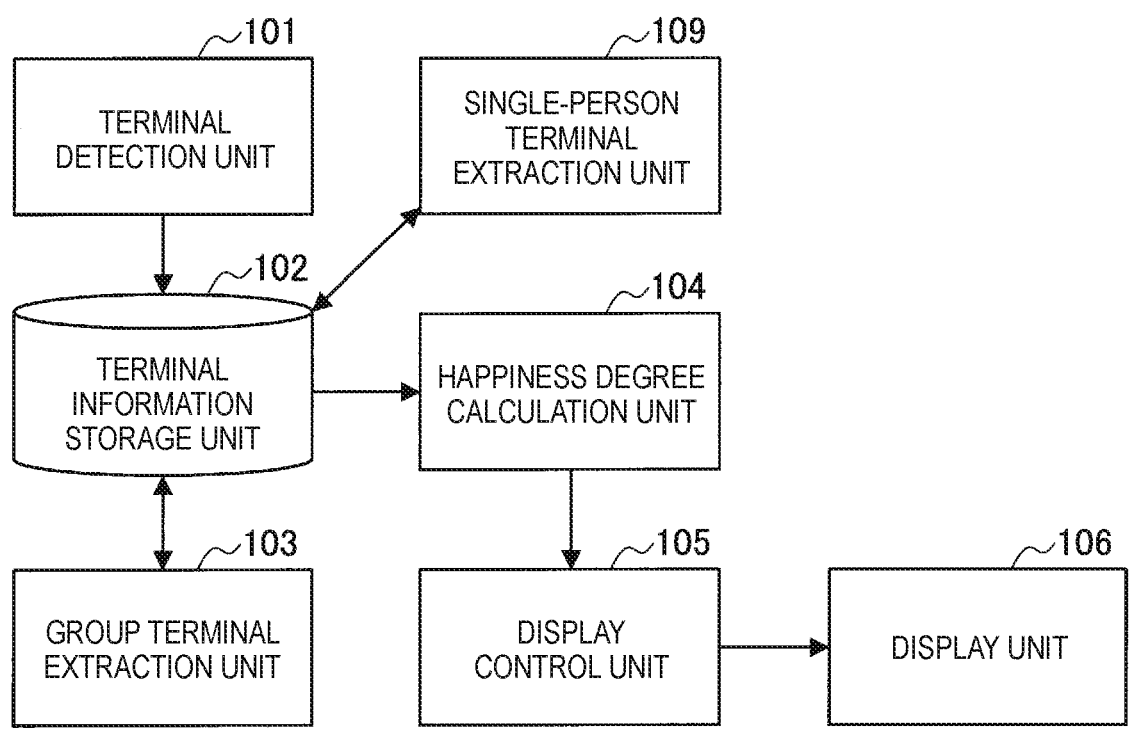
FIG. 33 is a diagram illustrating a functional configuration example of an information processing device according to a fourth embodiment.

FIG. 33 is a diagram illustrating a configuration example of the information processing device 100-6 according to the fourth embodiment. The information processing device 100-6 can be implemented by, for example, a portable terminal device or a stationary terminal device such as a digital sign.

As illustrated in FIG. 33, the information processing device 100-6 includes a terminal detection unit 101, a terminal information storage unit 102, a group terminal extraction unit 103, a single-person terminal extraction unit 109, a happiness degree calculation unit 104, a display control unit 105, and a display unit 106. The single-person terminal extraction unit 109 extracts a single-person terminal $P_b$ which is operated by a single person from the terminal information acquired by the terminal detection unit 101 and stored in the terminal information storage unit 102. The single-person terminal can be distinguished using, for example, a co-occurrence rate. A specific method of extracting a single-person terminal will be described below with reference to FIG. 35.

When a degree of happiness is calculated on the basis of the group information generated by the group terminal extraction unit 103, the happiness degree calculation unit 104 also refers to single-person terminal information to calculate the degree of happiness. A specific method of calculating the degree of happiness with reference to the single-person terminal information will be described below with reference to FIG. 36.

(Operation Processing)

The happiness degree display process according to the fourth embodiment is performed as in the first embodiment except that the processing of step S109 in the processing of steps S103 to S118 illustrated in FIG. 3 according to the first embodiment is changed to the terminal extraction process to be described next.

Figures 34, 35:
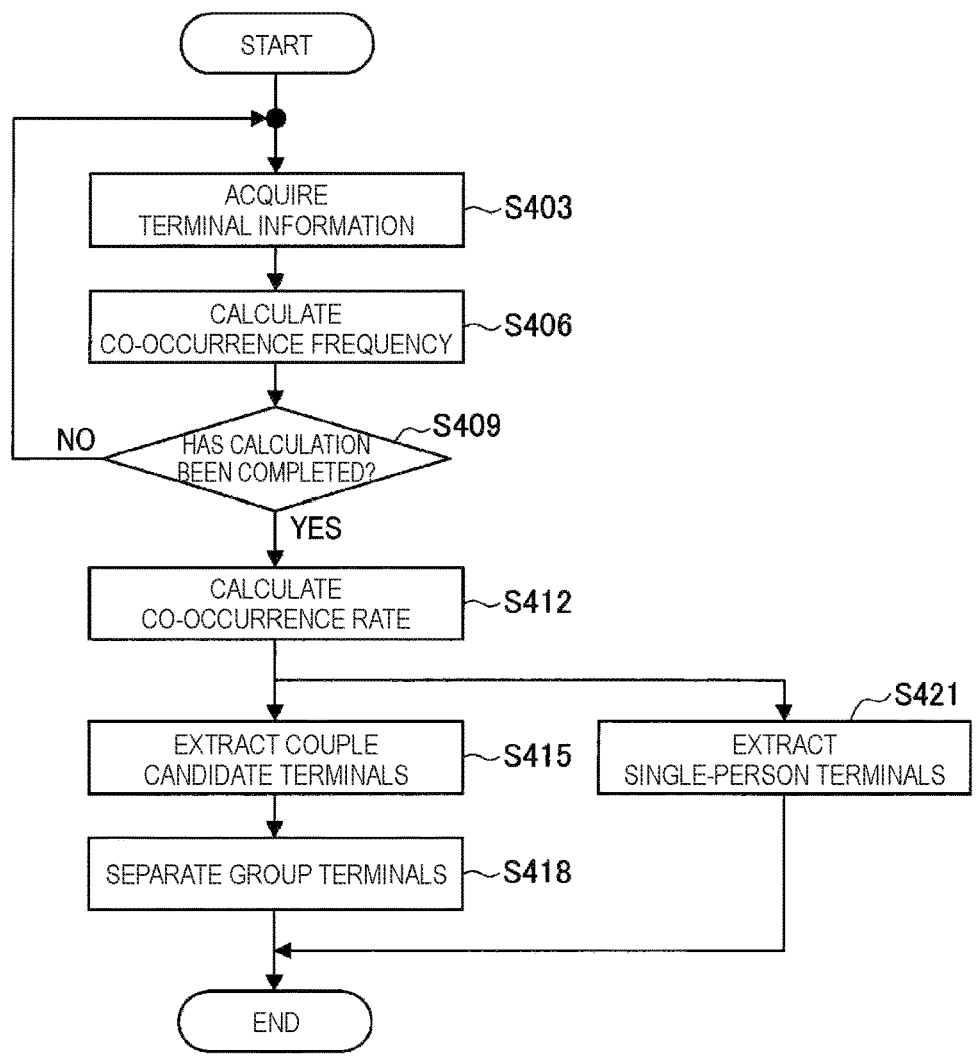
FIG. 34 is a flowchart illustrating a terminal extraction process according to the fourth embodiment.
FIG. 35 is a diagram illustrating an example of a co-occurrence rate matrix according to the fourth embodiment.

FIG. 34 is a flowchart illustrating the terminal extraction process according to the fourth embodiment. As illustrated in FIG. 34, the group terminal extraction unit 103 acquires terminal information in an extraction target period from the terminal information storage unit 102 (S403) and calculates a co-occurrence frequency of each terminal (S406).

Next, when calculation of all co-occurrence frequencies of information processing terminals detected in the same time period in the extraction target period is completed (S409/Yes), the group terminal extraction unit 103 calculates the co-occurrence rate of each terminal (S412).

Next, the group terminal extraction unit 103 extracts couple terminal candidates on the basis of the calculated co-occurrence rate (S415).

Next, the group terminal extraction unit 103 separates group terminals (in a broad sense) including couple terminals from the extracted couple terminal candidates (S418). Group information about the separated group terminals is stored in the terminal information storage unit 102.

On the other hand, the single-person terminal extraction unit 109 extracts a single-person terminal on the basis of the calculated co-occurrence rate (S421). Here, FIG. 35 illustrates an example of the co-occurrence matrix of each terminal. As illustrated in FIG. 35, the single-person terminal $P_b$ can be defined as a terminal whose co-occurrence rates with all terminals P other than the single-person terminal $P_b$ are lower than the threshold value Cth (for example, 0.1). In this case, the single-person terminal can also be said to be in a subset of terminals that were not extracted as couple terminals. Single-person terminal information about the extracted single-person terminal is stored in the terminal information storage unit 102.

The terminal extraction process according to the present embodiment has been described above. On the basis of the terminal information (group information and single-person terminal information) extracted as described above, the happiness degree calculation unit 104 calculates the degree of happiness. Here, FIG. 36 illustrates an example of the happiness coefficient corresponding to the number of terminals including a happiness coefficient of a single-person terminal.

As illustrated in FIG. 36, because a degree of happiness of a person acting alone is considered to be low, the happiness coefficient is set to, for example, "−0.1." In this case, for example, in a case where five couple terminal sets, three group terminal sets, each including three terminals, one set of six group terminals, and four single terminals are located in the target place, the degree of happiness degree h of the place is calculated as "13.1" according to the following Formula 7.

[Math. 7]

$$h=2.0\times5+1.0\times3+0.5\times1+(-0.1)\times4 \qquad \text{Formula 7}$$

2-5. Hardware Configuration

Finally, the hardware configuration of the information processing device 1000 common to the embodiments of the present disclosure will be described with reference to FIG. 37. Functions of the information processing devices 100-1 to 100-6, the servers 200-1 to 200-4, the detection devices 400 and 410, and the display device 500 according to the present embodiment are implemented through cooperation of software and hardware of the information processing device 1000 to be described below. Also, the hardware configuration illustrated in FIG. 37 is an example and it is not always necessary for all the components to be included.

Figure 37:
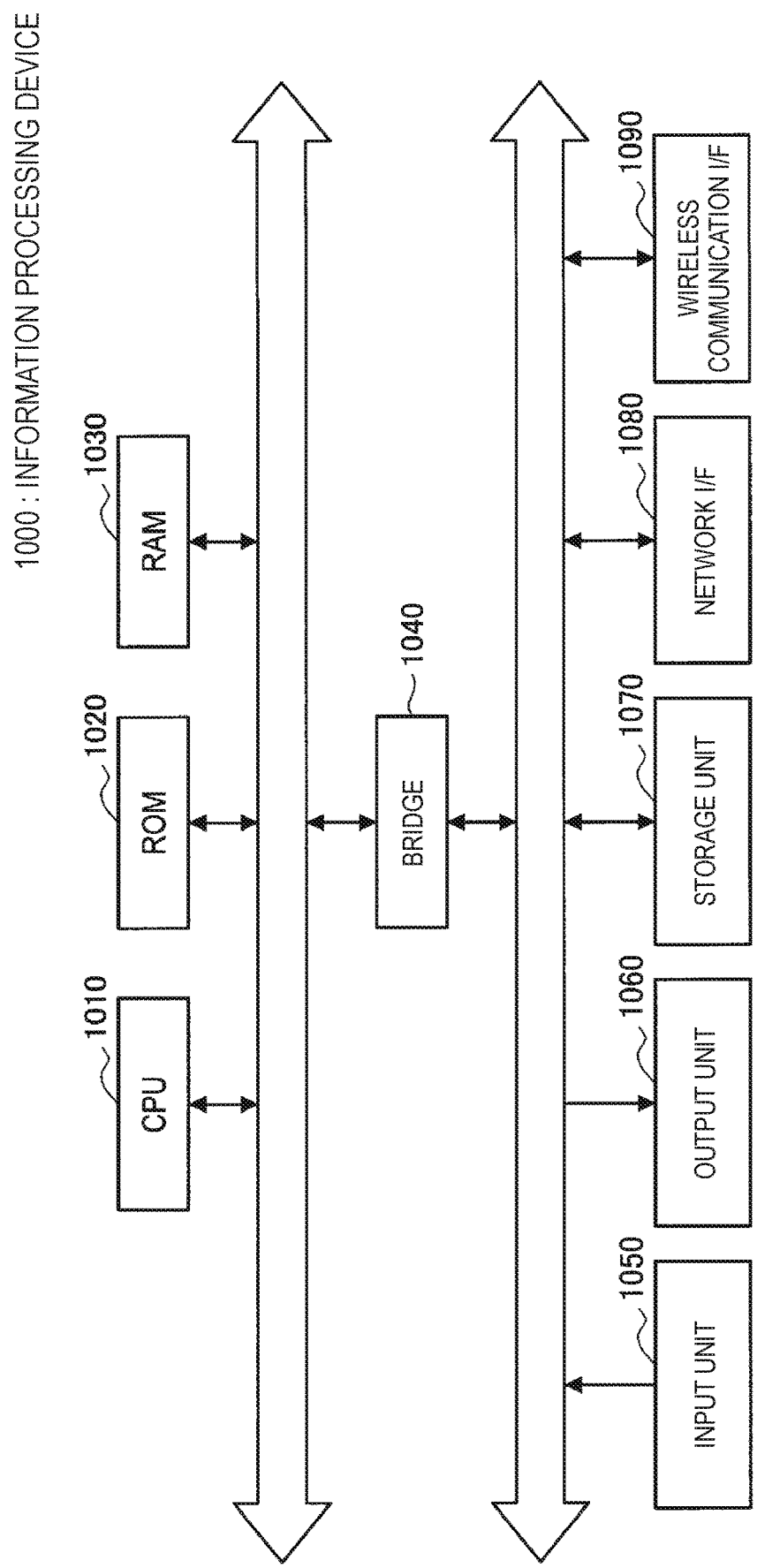
FIG. 37 is a diagram illustrating a hardware configuration example of an information processing device according to an embodiment of the present disclosure.

FIG. 37 is a diagram illustrating a hardware configuration of the information processing device 1000 according to an embodiment of the present disclosure. As illustrated in FIG. 37, the information processing device 1000 includes a central processing unit (CPU) 1010, a read only memory (ROM) 1020, a random access memory (RAM) 1030, a bridge 1040, an input unit 1050, an output unit 1060, a storage unit 1070, a network interface (I/F) 1080, and a wireless communication I/F 1090.

The CPU 1010 functions as an arithmetic processing unit and cooperates with various programs to implement operations of various functions within the information processing device 1000 (for example, the terminal detection unit 101, the group terminal extraction unit 103, the happiness degree calculation unit 104, the display control unit 105, the situation recognition unit 108, the single-person terminal extraction unit 109, and the like). Also, the CPU 1010 may be a microprocessor. The ROM 1020 stores programs, calculation parameters, or the like used by the CPU 1010. The RAM 1030 temporarily stores a program to be used in the execution of the CPU 1010 or parameters or the like appropriately changing during execution. The CPU 1010, the ROM 1020, and the RAM 1030 are mutually connected through an internal bus including a CPU bus or the like.

The input unit 1050 includes an input means such as a mouse, a keyboard, a touch panel, a button, a microphone, a camera, a switch, or a lever for a user to input information, an input control circuit that generates an input signal on the basis of an input by the user and outputs the input signal to the CPU 1010, and the like. By operating the input unit 1050, the user of the information processing device 1000 can input various data and issue processing operation instructions to the information processing device 1000. Also, the input unit 1050 may be means for detecting sensor data through various sensors such as an acceleration sensor, a gyro sensor, a geomagnetic sensor, a position measurement sensor, a temperature sensor, and a biometric sensor.

For example, the output unit 1060 performs an output to a display device such as a liquid crystal display (LCD) device, or an organic light emitting diode (OLED) device. Further, the output unit 1060 may output sounds from speakers or headphones.

The storage unit 1070 is a device for storing data. The storage unit 1070 may include a storage medium, a recording device that records data in the storage medium, a reading device that reads data from the storage medium, a deletion device that deletes data recorded on the storage medium, and the like. The storage unit 1070 stores programs executed by the CPU 1010 and various types of data. Also, for example, the storage unit 1070 may constitute the terminal information storage unit 102.

The network I/F 1080 is a communication interface including communication devices for connecting to a network. Also, the network I/F 1080 may be a communication device compatible with a wireless local area network (LAN) or a communication device compatible with long term evolution (LTE). For example, the network I/F 1080 may configure a part of the network communication unit 107.

The wireless communication I/F 1090 is a communication interface for connecting to an information processing device or a surrounding device outside the information processing device 1000. Although a configuration having the wireless communication I/F 1090 is provided as an example here, a communication interface connected to an external information processing device or a surrounding device through wired communication may be provided. For example, the wireless communication I/F 1090 can constitute a part of the terminal detection unit 101, receive Wi-Fi radio waves or the like transmitted from the information processing terminals, and acquire terminal information from the information processing terminals.

3. CONCLUSION

As described above, in the information processing system according to the embodiment of the present disclosure, it is possible to calculate a degree of happiness in a surrounding area by extracting the group behavior of a surrounding information processing terminal.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, a computer program for causing hardware such as the CPU, the ROM, and the RAM built into the information processing devices 100-1 to 100-6, the servers 200-1 to 200-4, the detection devices 400 and 410, or the display device 500 to exert the functions of the information processing devices 100-1 to 100-6, the servers 200-1 to 200-4, the detection devices 400 and 410, or the display device 500 can also be created. Also, a computer-readable storage medium storing the computer program is also provided.

Also, the group terminal extraction process according to the present embodiment analyzes information about information processing terminals detected in the same time period by a plurality of detection devices 400 arranged in the neighborhood and analyzes information about information processing terminals detected in separate time periods by a plurality of detection devices 400 arranged at separate positions, so that it is possible to more accurately extract group terminals.

In addition, it is possible to improve the accuracy of group terminal extraction by reducing a detection range and an observation time of the detection device (or the terminal detection unit).

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing system including:
- a communication unit configured to receive identification information from a detection device that detects the identification information of a surrounding terminal device; and
- a control unit configured to extract, as group terminal devices, a plurality of pieces of identification information that are received by the communication unit and indicate a plurality of terminal devices detected by the detection device within a predetermined time, and to calculate a degree of happiness around the detection device in accordance with an extraction result.

(2)

The information processing system according to (1), in which the communication unit transmits the degree of happiness to a display device capable of displaying the degree of happiness along with a map image.

(3)

The information processing system according to (2), in which the communication unit performs the transmission to a display device capable of displaying a map image indicating a degree of happiness associated with each of pieces of position information indicating physical positions of a plurality of detection devices.

(4)

The information processing system according to (2) or (3), in which the display device is a device integrated with the detection device.

(5)

The information processing system according to any one of (1) to (4), in which the control unit cancels the extraction as the group terminal devices when the plurality of pieces of identification information extracted as the group terminal devices are estimated to indicate a plurality of terminal devices carried by a same person.

(6)

The information processing system according to any one of (1) to (5), in which the control unit excludes the identification information during the extraction of the group terminal devices when the identification information detected by the detection device is estimated to indicate a fixed terminal device.

(7)

The information processing system according to any one of (1) to (6), in which the control unit calculates the degree of happiness in accordance with at least one of attribute information corresponding to the detection device, a time period corresponding to the predetermined time, and a surrounding environment of the detection device.

(8)

The information processing system according to any one of (1) to (7), in which the control unit extracts, as the group terminal devices, the plurality of pieces of identification information indicating the plurality of terminal devices detected by the detection device within the predetermined time in accordance with a co-occurrence rate thereof and calculates the degree of happiness around the detection device on the basis of an extraction result.

(9)

The information processing system according to (8), in which the control unit extracts a terminal device in which the co-occurrence rate is less than or equal to a predetermined threshold value as a single terminal device and calculates the degree of happiness around the detection device on the basis of an extraction result.

(10)

An information processing device including:
- a detection unit configured to detect identification information of a surrounding terminal device; and
- a control unit configured to extract, as group terminal devices, a plurality of pieces of identification information indicating a plurality of terminal devices detected by the detection unit within a predetermined time and to calculate a degree of happiness around the detection unit on the basis of an extraction result.

(11)

The information processing device according to (10),
- in which the control unit generates a map image indicating the degree of happiness associated with position information indicating a physical position of the information processing device, and
- the information processing device further includes a display unit configured to display the generated map image.

(12)

The information processing device according to (11), further including:
- a communication unit configured to receive, from a surrounding information processing device, the degree of happiness associated with the position information indicating the physical position of the information processing device,
- in which the control unit generates a map image indicating a degree of happiness associated with each of pieces of position information indicating physical positions of a plurality of information processing devices.

(13)

The information processing device according to any one of (10) to (12), in which the control unit cancels the extraction as the group terminal devices when the plurality of pieces of identification information extracted as the group terminal devices are estimated to indicate a plurality of terminal devices carried by a same person.

(14)

The information processing device according to any one of (10) to (13), in which the control unit excludes the identification information during the extraction of the group terminal devices when the identification information detected by the detection unit is estimated to indicate a fixed terminal device.

(15)

The information processing device according to any one of (10) to (14), in which the control unit calculates the degree of happiness in accordance with at least one of attribute information corresponding to the information processing device, a time period corresponding to the predetermined time, and a surrounding environment of the information processing device.

(16)

The information processing device according to any one of (10) to (15), in which the control unit extracts, as the group terminal devices, the plurality of pieces of identification information indicating the plurality of terminal devices detected by the detection unit within the predetermined time in accordance with a co-occurrence rate thereof and calculates the degree of happiness around the information processing device on the basis of an extraction result.

(17)

The information processing device according to (16), in which the control unit extracts a terminal device in which the co-occurrence rate is less than or equal to a predetermined threshold value as a single terminal device and calculates the degree of happiness around the information processing device on the basis of an extraction result.

(18)

An information processing method including:
receiving, by a communication unit, identification information from a detection device that detects the identification information of a surrounding terminal device; and
extracting, by a control unit, as group terminal devices, a plurality of pieces of identification information that are received by the communication unit and indicate a plurality of terminal devices detected by the detection device within a predetermined time, and calculating a degree of happiness around the detection device in accordance with an extraction result.

(19)

A computer-readable storage medium having a program stored therein, the program causing a computer to function as:
a detection unit configured to detect identification information of a surrounding terminal device; and
a control unit configured to extract, as group terminal devices, a plurality of pieces of identification information indicating a plurality of terminal devices detected by the detection unit within a predetermined time and to calculate a degree of happiness around the detection unit on the basis of an extraction result.

REFERENCE SIGNS LIST 100 (100-1 to 100-6) information processing device
101, 401 terminal detection unit
102, 202 terminal information storage unit
103,203 group terminal extraction unit
104,204 happiness degree calculation unit
105, 502 display control unit
106, 503 display unit
107, 201, 402, 501 network communication unit
108 situation recognition unit
200 (200-1 to 200-4) server
400, 410 detection device
500 display device
3 network

The invention claimed is:

1. An information processing device, comprising:
a processor configured to:
control reception of identification information from a detection device that detects the identification information of a surrounding terminal device, wherein the detection device is at an event site; and
extract a plurality of pieces of the identification information based on a timestamp of the reception of the identification information, wherein the plurality of pieces of the identification information indicates a plurality of terminal devices detected by the detection device within a determined time;
calculate co-occurrence rate of each terminal device of the plurality of terminal devices around the detection device in accordance with a result of the extraction, wherein the co-occurrence rate indicates whether the plurality of terminal devices are group terminal devices in the event site; and
display, on a display device, a plurality of icons superimposed on a map image of the event site, wherein
a display position of each icon of the plurality of icons on the map image corresponds to a specific location within the event site, and
a size of each icon of the plurality of icons corresponds to the co-occurrence rate as a measure of a degree of happiness of the specific location around the detection device.

2. The information processing device according to claim 1, wherein the display device is a device integrated with the detection device.

3. The information processing device according to claim 1, wherein the processor is further configured to cancel the extraction as the group terminal devices based on the plurality of pieces of the identification information that is estimated to indicate that the plurality of terminal devices is carried by a same person.

4. The information processing device according to claim 1, wherein the processor is further configured to exclude the identification information during the extraction based on the identification information that is estimated to indicate a fixed terminal device.

5. The information processing device according to claim 1, wherein the processor is further configured to calculate the co-occurrence rate in accordance with at least one of attribute information corresponding to the detection device, a time period corresponding to the determined time, and a surrounding environment of the detection device.

6. The information processing device according to claim 1, wherein the processor is further configured to
extract, as the group terminal devices, the plurality of pieces of the identification information indicating the plurality of terminal devices detected by the detection device within the determined time in accordance with the co-occurrence rate thereof.

7. The information processing device according to claim 6, wherein the processor is further configured to
extract a terminal device in which the co-occurrence rate is less than or equal to a determined threshold value as a single terminal device.

8. An information processing system, comprising:
a detection device configured to detect identification information of a surrounding terminal device, wherein the detection device is at an event site; and
a processor configured to:
extract a plurality of pieces of the identification information based on a timestamp of the detection of the identification information, wherein the plurality of pieces of the identification information indicates a plurality of terminal devices detected by the detection device within a determined time; and
calculate a co-occurrence rate of each terminal device of the plurality of terminal devices around the detection device based on a result of the extraction, wherein the co-occurrence rate indicates whether the plurality of terminal devices are group terminal devices in the event site; and a display device configured to display a plurality of icons superimposed on a map image of the event site, wherein
a display position of each icon of the plurality of icons on the map image corresponds to a specific location within the event site, and
a size of each icon of the plurality of icons corresponds to the co-occurrence rate as a measure of a degree of happiness of the specific location around the detection device.

9. The information processing system according to claim 8, wherein the processor is further configured to generate the map image indicating the co-occurrence rate associated with position information indicating a physical position of the detection device.

10. The information processing system according to claim 9, wherein the processor is further configured to:
control reception of, from a surrounding information processing device, the co-occurrence rate associated with the position information indicating the physical position of the detection device; and
generate the map image indicating the co-occurrence rate associated with each of piece of the position information indicating physical positions of a plurality of information processing devices.

11. The information processing system according to claim 8, wherein the processor is further configured to cancel the extraction as the group terminal devices based on the plurality of pieces of the identification information that is estimated to indicate that the plurality of terminal devices is carried by a same person.

12. The information processing system according to claim 8, wherein the processor is further configured to exclude the identification information during the extraction of the group terminal devices based on the identification information detected by the detection device that is estimated to indicate a fixed terminal device.

13. The information processing system according to claim 8, wherein the processor is further configured to calculate the co-occurrence rate in accordance with at least one of attribute information corresponding to the information processing system, a time period corresponding to the determined time, and a surrounding environment of the information processing system.

14. The information processing system according to claim 8, wherein the processor is further configured to
extract, as the group terminal devices, the plurality of pieces of the identification information indicating the plurality of terminal devices detected by the detection device within the determined time in accordance with the co-occurrence rate thereof.

15. The information processing system according to claim 14, wherein the processor is further configured to
extract a terminal device in which the co-occurrence rate is less than or equal to a determined threshold value as a single terminal device.

16. The information processing system according to claim 8, wherein
the detection device is further configured to detect terminal information including a terminal ID and a radio wave intensity of each of the plurality of terminal devices; and
the processor is further configured to group information corresponding to the group terminal devices based on the terminal information.

17. An information processing method, comprising:
controlling, by a processor, reception of identification information from a detection device that detects the identification information of a surrounding terminal device, wherein the detection device is at an event site; and
extracting, by the processor, a plurality of pieces of the identification information based on a timestamp of the reception of the identification information, wherein the plurality of pieces of the identification information indicates a plurality of terminal devices detected by the detection device within a determined time;
calculating, by the processor, a co-occurrence rate of each terminal device of the plurality of terminal devices around the detection device in accordance with a result of the extraction, wherein the co-occurrence rate indicates whether the plurality of terminal devices are group terminal devices in the event site; and
displaying, on a display device, a plurality of icons superimposed on a map image of the event site, wherein
a display position of each icon of the plurality of icons on the map image corresponds to a specific location within the event site, and
a size of each icon of the plurality of icons corresponds to the co-occurrence rate as a measure of a degree of happiness of the specific location around the detection device.

18. A non-transitory computer-readable medium having stored thereon, computer-executable instructions, which when executed by a computer, cause the computer to execute operations, the operations comprising:
detecting, by a detecting device, identification information of a surrounding terminal device at an event site;
extracting a plurality of pieces of the identification information based on a timestamp of the detection of the identification information, wherein the plurality of pieces of the identification information indicates a plurality of terminal devices detected within a determined time; and
calculating a co-occurrence rate of each terminal device of the plurality of terminal devices around the detection device based on a result of the extraction, wherein the co-occurrence rate indicates whether the plurality of terminal devices are group terminal devices in the event site; and
displaying, on a display device, a plurality of icons superimposed on a map image of the event site, wherein
a display position of each icon of the plurality of icons on the map image corresponds to a specific location within the event site, and
a size of each icon of the plurality of icons corresponds to the co-occurrence rate as a measure of a degree of happiness of the specific location around the detection device.

* * * * *